(12) United States Patent
Timler et al.

(10) Patent No.: US 11,892,379 B2
(45) Date of Patent: Feb. 6, 2024

(54) THERMAL AND/OR OPTICAL SIGNATURE SIMULATING SYSTEMS AND METHODS OF MAKING AND USING SUCH SYSTEMS

(71) Applicant: Science Applications International Corporation, Reston, VA (US)

(72) Inventors: John P. Timler, River Ridge, LA (US); David M. Morris, Bloomington, IN (US)

(73) Assignee: Science Applications International Corporation, Reston, VA (US)

(*) Notice: Subject to any disclaimer, the term of this patent is extended or adjusted under 35 U.S.C. 154(b) by 387 days.

(21) Appl. No.: 17/362,176

(22) Filed: Jun. 29, 2021

(65) Prior Publication Data

US 2022/0412710 A1 Dec. 29, 2022

(51) Int. Cl.
*G01M 99/00* (2011.01)
*F41G 7/00* (2006.01)

(52) U.S. Cl.
CPC .......... *G01M 99/00* (2013.01); *G01M 99/002* (2013.01); *F41G 7/006* (2013.01)

(58) Field of Classification Search
CPC ..... G01M 99/00; G01M 99/002; F41G 7/006; F41J 2/02
See application file for complete search history.

(56) References Cited

U.S. PATENT DOCUMENTS

| | | | |
|---|---|---|---|
| 5,129,323 A | 7/1992 | Park | |
| 8,048,242 B1 | 11/2011 | Tappan et al. | |
| 10,619,059 B1 | 4/2020 | Morris et al. | |
| 2015/0211831 A1* | 7/2015 | Tamir | G09B 19/00 89/1.813 |

OTHER PUBLICATIONS

Melek et al., "Interactive simulation of burning objects", Proceedings of the 11th Pacific Conference on Computer Graphics and Applications (PG'03), pp. 462-466. (Year: 2003).*

(Continued)

*Primary Examiner* — Kiho Kim
(74) *Attorney, Agent, or Firm* — Banner & Witcoff, Ltd.

(57) ABSTRACT

Countermeasure simulating structures may include (a) a base and (b) one or more separated combustible tracks fixed to the base's surface. The combustible tracks may include thermite and/or other combustible material. The combustible tracks may be shaped to simulate countermeasure flares deployed by a vehicle (e.g., a jet). The countermeasure simulating structure may be incorporated into a countermeasure simulating system that includes (a) an infrared and/or optical sensing system (e.g., like those included in missiles) and (b) a simulator mount holding the countermeasure simulating structure. Countermeasures may be tested in such systems by: (a) arranging an infrared and/or optical sensing system to receive infrared energy and/or visible light emitted by the countermeasure simulating structure; (b) igniting the combustible material of the combustible track such that combustion of the combustible material moves along the combustible track; and (c) determining whether the infrared and/or optical sensing system tracks infrared energy and/or visible emitted by the combustion.

20 Claims, 13 Drawing Sheets

(56) References Cited

OTHER PUBLICATIONS

Durban, M. M., et al., "Development and Characterization of 3D Printable Thermite Component Materials," Lawrence Livermore National Laboratory, Advanced Materials Technologies, Mar. 30, 2018, pp. 1-20. Retreived from the Internet Dec. 8, 2020 https://www.osti.gov/pages/servlets/purl/1497290.

Ewing, Craig M., "The Advanced Guided Weapon Testbed (AGWT) at the Air Force Research Laboratory Munitions Directorate," Aug. 2010, pp. 1-16. Retreived from the Internet Dec. 8, 210, https://apps.dtic.mil/dtic/tr/fulltext/u2/ a530903.

Gearhart, Scott A., et al., "Infrared System Test and Evaluation at APL," John Hopkins APL Technical Digest, vol. 18, No. 3 (1997), pp. 448-459. Retreived from the Internet Dec. 8, 2020 https:/www.jhuapl.edu/Content/techdigest/pdf/V18-N03/18-03-Gear.

Cabib, Dario, et al., "Missle warning and countermeasure systems in flight testing, by threat simulation and countermeasure analysis in the field," Infrared Technology and Applications XXXII (2006), Researchgate, SPIE vol. 6206, pp. 1-11. Retreived from the Internet Dec. 8, 2020 https://www.researchgate.net/profile/Dario_Cabib/publication/229043790_Missle_warning_and_countermeasurte_systems_in-flight_testing_by_threat_siulation_and_countermeasure_analysis_in_the_field_-_art_no_62061Y/.

Vaitekunas, D.A., et al., "Navel Threat and Countermeasures Simulator," Repinted from Infrared Technology XX, Davis Engineering, SPIE—The International Society for Optical Engineering, Jul. 25028, 1994, vol. 2269, San Diego, California, Retreived from the Internet Dec. 8, 2020 https://www.davis-eng.com/docs/papers/Naval%20Threat%20and%20Countermeasurers%20Simulator%20(Infrared%20Technology%20XX), pp. 1-16.

\* cited by examiner

THERMAL AND/OR OPTICAL SIGNATURE SIMULATING SYSTEMS AND METHODS OF MAKING AND USING SUCH SYSTEMS

GOVERNMENT LICENSE RIGHTS

This invention was made with Government support under NSWC Crane Seaport-E Contract No. N00178-04-D-4119-FC46 awarded by the U.S. Naval Surface Warfare Center. The Government has certain rights in this invention.

BACKGROUND

Many modern weapons (e.g., surface-to-air missiles or air-to-air missiles) are equipped with infrared and/or optical sensors used to locate and track a target, such as a fighter jet or other aircraft. In many instances, when being tracked by a missile, the target aircraft will deploy one or more countermeasures in an effort to defeat the weapon system and avoid being struck by the missile. Some countermeasures comprise a flare (e.g., a decoy flare) that counters an infrared homing ("heat-seeking") missile. Such flares commonly are composed of a pyrotechnic composition (e.g., based on aluminum, magnesium, or another hot-burning metal) with a burning temperature equal to or hotter than the engine exhaust emitted by the target aircraft. The goal in deploying such countermeasures is to create an alternative "target" to the target aircraft that "fools" the infrared-guided missile to seek out and follow the heat signature from the decoy flare rather than follow the heat signature emitted by the aircraft's engine(s).

Missile manufacturers have an interest in assuring that their tracking and/or guidance systems accurately identify and track the heat signature of the desired target (e.g., an aircraft) and avoid being "fooled" by countermeasures. On the other hand, countermeasure manufacturers have an interest in assuring that their countermeasure products have appropriate characteristics (e.g., heat signatures, flare deployment paths, and multiple flare deployment dynamics, etc.) to effectively "fool" the missile systems. Thus, both missile manufacturers and countermeasure manufacturers perform significant testing in an effort to improve their products' effectiveness and reliability.

One primary way of testing infrared and optical missile sensors and ways to defeat them includes live fire flight tests where actual flares and countermeasure packages are deployed from moving aircraft. Another testing method involves infrared screen projectors where arrays of bolometers are used to project thermal images that are intended to simulate the deployment of countermeasures and flares. Both of these methods require significant capital expenditures. Also, the screen projectors are not capable of achieving temperatures high enough to simulate accurately the true thermal signatures of state-of-the-art flares and countermeasures.

SUMMARY

This Summary introduces a selection of concepts relating to this technology in a simplified form as a prelude to the Detailed Description that follows. This Summary is not intended to identify key or essential features.

Aspects of this disclosure relate to thermal and/or optical signature simulating structures, such as countermeasure simulating structures used to test effectiveness of countermeasures and/or missile tracking and/or guidance systems. Additional aspects of this disclosure relate to methods of making thermal and/or optical signature simulating structures including countermeasure simulating structures. Still additional aspects of this disclosure relate to infrared and/or optical sensor test systems and countermeasure simulating systems, as well as to methods of making and/or using such infrared and/or optical sensor test systems and/or countermeasure simulating systems.

These and other features of this technology are described in more detail below.

BRIEF DESCRIPTION OF THE DRAWINGS

Some features of this technology are shown by way of example, and not by way of limitation, in the figures of the accompanying drawings. When the same reference numeral is used in multiple figures, that reference numeral is intended to refer to the same or similar components or features.

DETAILED DESCRIPTION

Figure 1A:
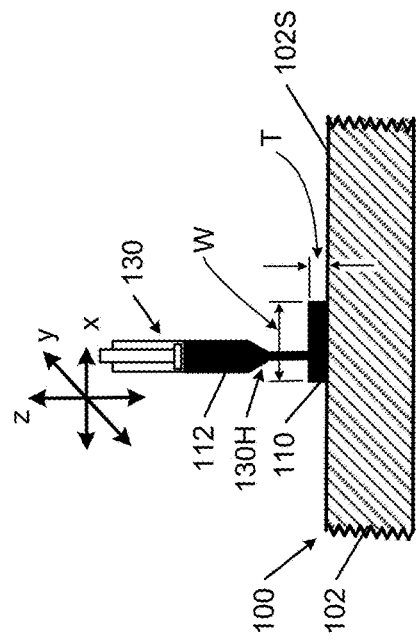
FIGS. 1A and 1B provide various views of an example thermal and/or optical signature simulating structure and an example method of making it in accordance with some aspects of this technology.

The following specification uses various terms that are intended to have the meanings provided below unless otherwise specified or clear from the context.

"Infrared radiation," as that term is used herein, means electromagnetic energy within the wavelength range of 700 nanometers ("nm") to 1 millimeter ("mm") of the electromagnetic spectrum. "Infrared signature," as that term is used herein, means the appearance of objects to infrared sensors. An "infrared signature" depends on many factors, including the shape and size of the object, the temperature of the object, the emissivity of the object, the reflection of external sources (earthshine, sunshine, skyshine) from the object's surface, the background against which the object is viewed, and the waveband of the detecting sensor.

"Visible radiation," as that term is used herein, means electromagnetic energy within the wavelength range of 380 nm to 750 nm. "Optical signature," as that term is used herein, means the appearance of objects to visible radiation or optical sensors. An "optical signature" depends on many factors, including the shape and size of the object, the color of the object, the finish on the object, the reflection of external sources (earthshine, sunshine, skyshine) from the object's surface, the background against which the is viewed, and the waveband of the detecting sensor.

A "track," as that term is used herein, means a substantially one-dimensional structural arrangement of material. A "track" will have a continuous length dimension (which may be straight or curved) L that is: (a) at least 20 times larger than a width dimension W present over that length (i.e., L≥20×W) and (b) at least 20 times larger than a thickness dimension T present over that length (i.e., L≥20×T). See dimensions L, W, and T in FIGS. 1A and 1B. Some simulation systems in accordance with aspects of this technology will have one or more "tracks" having a continuous length dimension (which may be straight or curved) L that is: (a) at least 40 times or at least 60 times or at least 80 times larger than a width dimension W present over that length (i.e., L≥(40 or 60 or 80)×W) and (b) at least 40 times or at least 60 times or at least 80 times larger than a thickness dimension T present over that length (i.e., L≥(40 or 60 or 80)×T). A "track's" width W and/or thickness T may vary over the length L of the "track." A "track" may connect to or morph into one or more arrangements of material (the same material as the "track" or a different material) that does/do not have dimensions corresponding to a "track," as described above. Additionally or alternatively, a "track" may have an area where a singular track segment splits into two or more separated track segments (e.g., a "Y" junction) and/or an area where two or more separated track segments merge together to form one track segment.

A "combustible material," as that term is used herein, means a material that readily and sustainably burns (or combusts) once ignited. In addition to the material that readily and sustainably burns, a "combustible material" may be mixed with and/or include other materials (such as binders, solvents or the like used to make print media for applying the combustible material to another surface, etc.). Some example "combustible materials" used in accordance with this technology comprise "thermites." "Thermites" are pyrotechnic compositions of metal powder and metal oxide (e.g., a mixture of finely powdered aluminum and iron oxide (iron thermite); a mixture of finely powdered aluminum and copper oxide (copper thermite); a mixture of finely powdered aluminum and chromium oxide; a mixture of finely powdered aluminum and manganese oxide; thermates; etc.). When ignited, thermite undergoes an exothermic reduction-oxidation reaction. Thermites can create brief bursts of heat and high temperature in a small area. U.S. Pat. No. 7,632,365 B1 (which patent is entirely incorporated herein by reference) describes some example "pyrotechnic thermite compositions" that may be used in accordance with some aspects of this technology. As a commercial example, thermites typically are used as the combustible material found in sparklers. In "combustible materials," thermites may be mixed with binders and/or other compositions to enable control of the burn rate and/or other properties of the resulting combustible material.

A "countermeasure package," as that term is used herein, means one or more countermeasure flares, countermeasure chaff, and/or other countermeasure components that are deployed by an aircraft or other vehicle. A "countermeasure package" may deploy a predetermined number of countermeasure flares (e.g., one or more), in predetermined trajectories, under predetermined timings, etc. Countermeasure packages are designed to alter a "target" sought and/or followed by an optical and/or infrared guidance and/or tracking system (e.g., of a missile or other weapon) from following the vehicle to follow one or more of the deployed countermeasures.

First, thermal and/or optical signature simulating structures 100, such as countermeasure simulating structures, in accordance with aspects of this technology will be described in conjunction with FIGS. 1A and 1B. This example thermal and/or optical signature simulating structure 100 includes a base 102 (e.g., a flat substrate in this illustrated configuration) including an exposed first surface 102S. The base 102 (or at least a portion of the first surface 102S of the base 102) may be formed from refractive or thermally reflective material. The base 102 may include a member formed from a non-flammable material, and/or a material with an ignition temperature higher than a temperature at which the first combustible material combusts. Examples of materials useful for the base 102 (or at least a portion of the first surface 102S of the base 102) include one or more materials selected from the group consisting of: wood, glass, wire mesh, and mica.

One or more combustible tracks 110 (also referred to as "tracks" herein) are fixed to the first surface 102S of the base 102. The combustible track(s) 110 include a combustible material (that may be dispersed in a binder). Examples of suitable combustible materials include thermite materials. Examples of suitable binders, when present, include one or more members selected from the group consisting of: polyvinylidene fluorides (PVDF), polyvinylpyrrolidones (PVP, also called polyvidone or povidone), and/or polyvinyl alcohols (PVA). The combustible track(s) 110 may be deposited onto the first surface 102S in any desired pattern. Some specific examples of combustible track 110 patterns include lines, parabolic arcs, cycloids, two-dimensional projections of helixes and starbursts, etc. A track 110's width W and/or thickness T dimension may vary over the length L of the track 110, or the width W and/or thickness T may remain constant over the track 110's length L. Random and/or arbitrary patterns of combustible tracks 110 also may be used in at least some examples of this technology. Some more specific examples and features of patterns in accordance with some aspects of this technology will be discussed in more detail below, e.g., in conjunction with FIGS. 7A through 16.

In some examples of this technology, the thermal and/or optical signature simulating structures 100 (e.g., countermeasure simulating structures) will be equipped with an igniter 120 (also called an "ignition source" herein) used to "activate" the combustible track(s) 110, e.g., initiate or activate combustion of the track(s) 110. The igniter 120, when present, may be engaged with the first surface 102S and/or another component of the base 102. Suitable igniters 120 include arc discharge devices (e.g., using a Tesla coil); laser or electric heating; chemical catalysts with suitable fuse apparatus; and/or any mechanism(s) that deliver a sufficient power pulse to initiate the thermite reaction in the print media or other substrate material. Additionally or alternatively, in some examples, one or more combustible track 110 can be ignited or activated from an ignition source that is not engaged with the base 102, such as a propane torch (optionally operated manually) or other flame and/or spark producing equipment. When multiple combustible tracks 110 are included on a single base 102, each track 110 may have a separate igniter 120 or one igniter 120 may initiate combustion of two or more (up to all) tracks 110 on the base 102. When multiple igniters 120 are present on a single base 102, the igniters 120 may be the same type or of two or more different types. Additionally or alternatively, the one or more igniters 120 may be remote controlled and/or computer controlled (e.g., so that individual igniters 120 and/or combustible tracks 110 may be activated in a predetermined timing and/or a predetermined sequence).

Figure 1B:
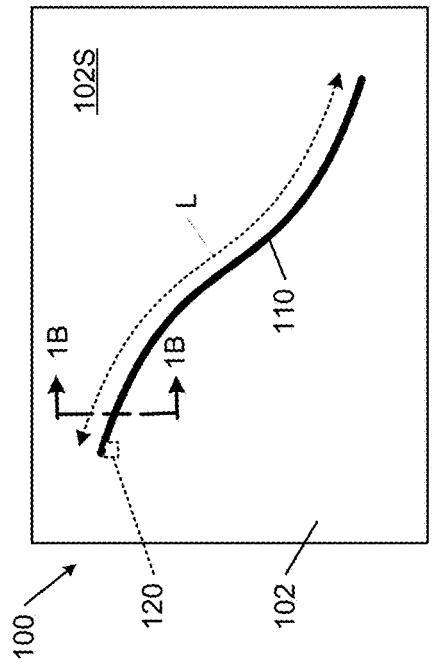

FIG. 1B further illustrates examples of methods of producing thermal and/or optical signature simulating structures 100 in accordance with aspects of this technology, including methods of producing countermeasure simulating structures. These methods involve printing a first combustible track 110 onto the first surface 102S of the base 102 (e.g., of the types described above) using a print device 130. The first combustible track 110 is printed as an "energetic ink" material 112 (e.g., an extrudable paste, an aerosol, ink media (e.g., ink jet media), etc.) that includes a first combustible material (e.g., a thermite material as described above). The first combustible material may include (e.g., may be dispersed in) a first binder (e.g., of the types described above) and/or a solvent (e.g., N, N-dimethylformamide ("DMF"), ethanol, isopropyl alcohol ("IPA"), toluene, etc.). The binder and/or solvent, when present, may help make the combustible material suitable for use in printing devices. The print head 130H of the print device 130 may be moved with respect to the base 102 to apply the combustible track(s) 110 to the base surface 102S in any desired pattern. At least a portion of the solvent is then removed (e.g., evaporates as the energetic ink "dries"), thereby leaving the combustible track(s) 110 fixed to the first surface 102S of the base 102. Two or more combustible tracks 110 may be applied to the base surface 102S in these same manners.

While any desired type of combustible material(s) and/or "energetic inks" may be used without departing from this technology, the following Table provides some example formulations for these materials. The amounts of materials specified in this Table can be scaled up or down, depending on the dimensions of combustible track 110 needed for that specific material or energetic ink.

TABLE 1

ENERGETIC INK FORMULATIONS

| Metals | Metal Amounts (grams) | Solvent | Solvent Volume (ml) | Binder |
|---|---|---|---|---|
| Al/Bi$_2$O$_3$ | 0.2 g Al and 1.04 g Bi$_2$O$_3$ | DMF | 10 ml | PVDF (0.025 g) |
| Al/CuO | 0.2 g Al and 0.348 g CuO | DMF | 20 ml | PVDF (0.050 g) |
| Al/CuO | 0.8 g Al and 1.392 g CuO | DMF | 20 ml | PVP(0.944 g) |
| Al/CuO | 0.2 g Al and 0.522 g CuO | DMF | 10 ml | PVA (0.100) |
| Al/CuO | 0.2 g Al and 0.522 g CuO | DMF | 20 ml | PVDF (0.050 g) |
| Al/CuO | 0.2 g Al and 0.522 g CuO | Ethanol | 20 ml | PVP(0.66 g) |
| Al/CuO | 0.2 g Al and 0.782 g CuO | Ethanol | 10 ml | |
| Al/ZnO/CuO | 0.2 g Al, 0.178 g ZnO, 0.348 g CuO | Ethanol | 10 ml | none |
| Al/CuO/Cu | 0.2 g Al, 0.522 g. CuO, 0.417 g Cu | Ethanol | 10 ml | none |
| Al/Bi$_2$O$_3$/ZnO | 0.2 g Al, 1.018 g Bi$_2$O$_3$, 0.089 g ZnO | Ethanol | 10 ml | none |
| Al/WO$_3$ | 0.4 g Al, 1.013 g WO$_3$ | Ethanol | 20 ml | none |
| Al/Fe$_2$O$_3$ | 0.4 g Al, 0.698 g Fe$_2$O$_3$ | Ethanol | 15 ml | none |
| Al/NiO | 0.2 g Al, 0.490 g NiO | Ethanol | 10 ml | none |
| Pd | 0.4 g Pd | Toluene | 20 ml | none |
| Al/Co | 0.2 g Al, 0.491 g Co | Ethanol | 10 ml | none |
| Si/CuO | 0.1 g Si, 0.567 g CuO | IPA | 10 ml | none |

Such ink media materials, e.g., including a solvent, binder, and thermite particles (or other combustible materials), may be formed and applied to substrates in manners generally known and used in the relevant arts. Such processes include printing techniques, such as the techniques described in U.S. Pat. No. 10,619,059 B2, which patent is entirely incorporated herein by reference. Printing techniques can produce any desired pattern or traces of the combustible material on the substrate 102 (e.g., any track 110 shape). In some aspects of this technology, the combustible track(s) 110 will simulate trajectories of flares and other countermeasures, as described in more detail herein.

Two or more combustible tracks 110 may be applied to a surface 102S of a base 102 in a similar manner, e.g., by printing. When multiple tracks 110 are present on a single base 102, the combustible material forming one track 110 (including any present binders, solvents, etc.) may be the same or different from the material(s) forming one or more other track(s) 110. Further, the dimensions of one track 110 (e.g., L, W, and/or T) may be the same or different from the dimensions of one or more other track(s) 110.

Figure 2:
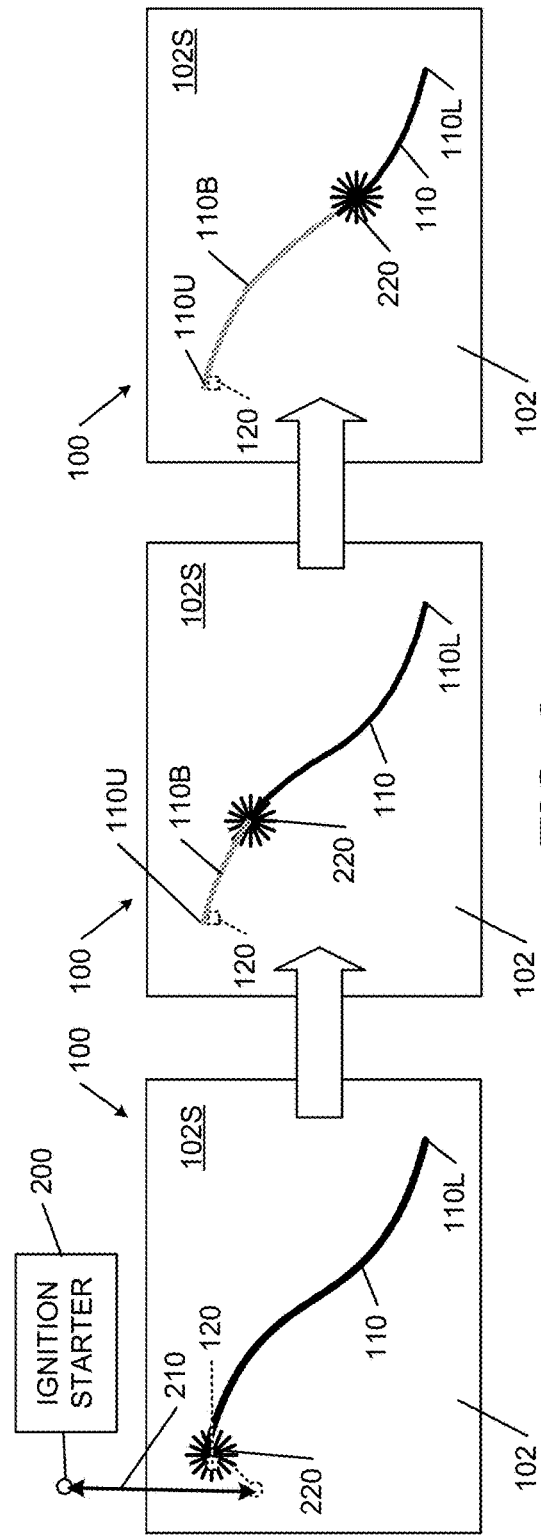
FIG. 2 illustrates ignition and burning of combustible material in a thermal and/or optical signature simulating structure in accordance with some aspects of this technology.

FIG. 2 illustrates examples of the manner in which combustible track(s) 110 of the types described above can be activated (ignited) and burn. As shown at the far left of FIG. 2, first an ignition starter 200 activates the igniter 120 present with the base 102, e.g., to generate a spark. While the illustrated example shows remote controlled activation of the igniter 120 (e.g., via wireless or wired communication lines 210, e.g., under computer control), other types of activation may be used, including manual activation, mechanical switch activation, etc.

Once ignited, the combustible material (e.g., thermite material) in the combustible track 110 begins to burn at the location of the igniter 120 and generates an ignition front 220 (e.g., burning fireball). As the combustible material in the combustible track 110 burns, the ignition front 220 moves along the combustible track 110 as shown in the center and right side of FIG. 2. Movement of the ignition front 220 along the combustible track 110 leaves a path or burnt track 110B behind the ignition front 220 (with respect to its direction of travel). The ignition front 220 continues moving along the combustible track 110 burning up the available combustible material until it reaches the end 110L of the combustible track 110. The combustible track(s) 110 may be shaped in any desired shape. In some aspects of this technology, the combustible track(s) 110 will be shaped to simulate the trajectory of a flare or other countermeasure deployed from a vehicle (such as an aircraft).

While FIG. 2 shows the igniter 120 located at one end (the upper end 110U) of the combustible track 110 and the ignition front 220 moving downward along the combustible track 110 toward the opposite end (the lower end 110L), other arrangements are possible, e.g., depending on the location of igniter 120 and ignition of the combustible track 110. If initially ignited at the lower end 110L of the combustion track 110, the ignition front 220 will move upward along the combustible track 110 to the upper end 110U. If initially ignited in a location along the length L between the upper end 110U and the lower end 110L, two ignition fronts 220 may be generated, one traveling in each direction along the track 110 away from the ignition location. If initially ignited in multiple locations along a single combustible track 110, multiple ignition fronts 220 may be generated and burn in either or both directions away from the ignition location, e.g., until the individual ignition front 220 (a) reaches another ignition front 220, (b) reaches an end 110U, 110L of the combustion track 110, or (c) reaches a segment of burnt track 110S.

Figure 3:
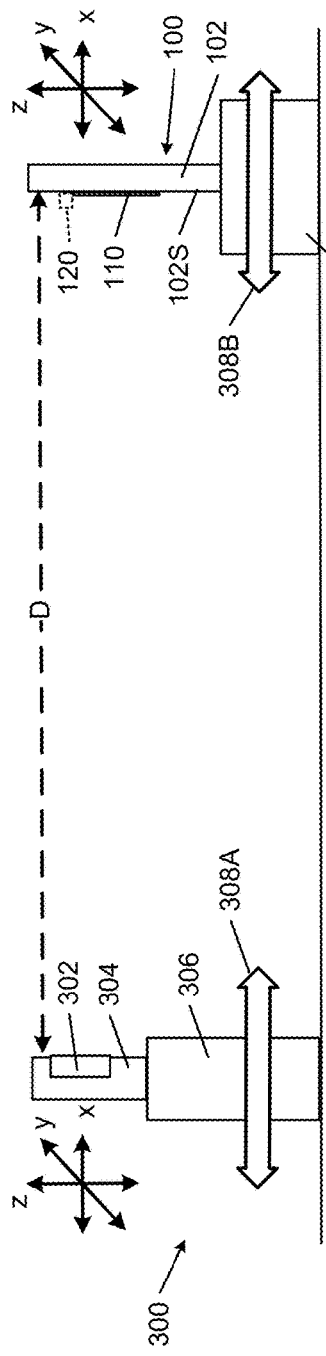
FIGS. 3, 4A, 4B, 4C, 5, and 6 illustrate examples of features and use of example infrared and/or optical test systems in accordance with aspects of this technology.

FIG. 3 illustrates an example infrared and/or optical sensor test system 300 (e.g., a countermeasure simulation system and/or test system) in accordance with some aspects of this technology. This example test system 300 includes an infrared or optical sensing system 302, which may constitute an infrared and/or optical sensing/tracking system 304, e.g., used on missiles or other weapons. The sensing/tracking system 304 may be engaged with a mount 306. This example test system 300 further includes a simulator mount 310 for holding a thermal and/or optical signature simulating structure 100, e.g., of the various types described above. The thermal and/or optical signature simulating structure 100 may constitute a countermeasure simulating structure as described above (and examples of which are described in more detail below). One or more combustible tracks 110 may be provided on the surface 102S of the thermal and/or optical signature simulating structure 100 base 102, as described above.

In at least some examples of this technology, the simulator mount 310 is movable with respect to the infrared and/or optical sensor 302, the sensing/tracking system 304, and/or the mount 306. This relative motion in the x-direction is shown in FIG. 3 by arrow 308A (illustrating potential motion of the mount 306) and arrow 308B (illustrating potential motion of the simulator mount 310). While arrows 308A and 308B depict relative motion in the x-direction only, relative motion could take place in any desired directions (i.e., in the x, y, and/or z direction(s)). Relative motion of the simulator mount 310 (and its attached simulating structure 100) with respect to the sensor 302, the sensing/tracking system 304, and/or the mount 306 may be used, for example, to simulate motion between an infrared and/or optical sensor 302 (e.g., located on a missile or other weapon) and its target (e.g., such as an aircraft deploying flash countermeasures). The distance D between the infrared and/or optical sensing system 302 and the thermal and/or optical signature simulating structure 100, along with the dimensions of the combustible track 110 (e.g., L, W, and/or T) and/or the relative motion of sensing system 302 and simulating structure 100, may be selected to simulate imaging conditions present in the actual system being simulated (e.g., so that from the point of view of the sensor 302, the combustible track(s) 110 will simulate the appearance of countermeasures deployed by a vehicle as viewed by a tracking system of a missile or other weapon). If desired, in some examples of this technology, fans or other wind machines may be used to blow any discharged smoke in a direction to simulate the actual appearance of smoke when countermeasures typically are deployed from a moving vehicle.

Figure 4A:
Figure 4B:
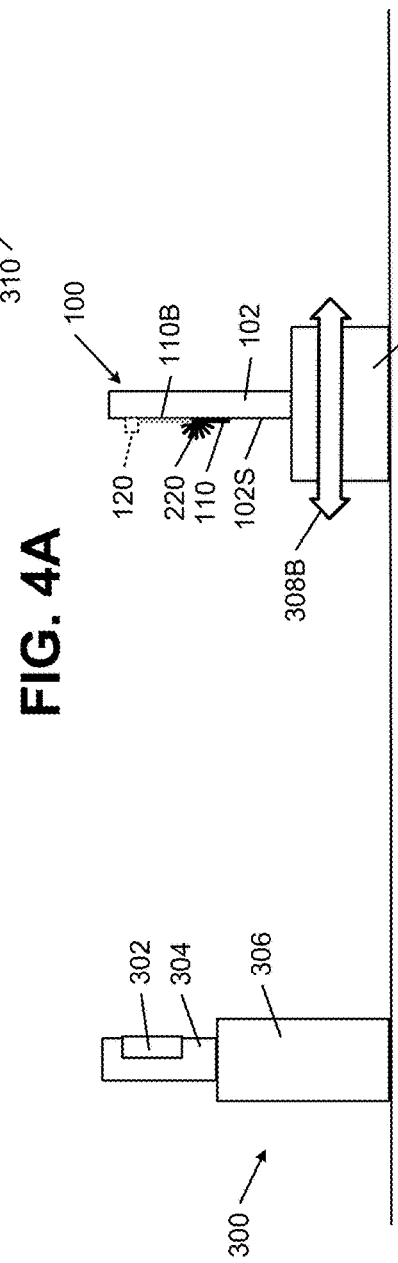
Figure 4C:
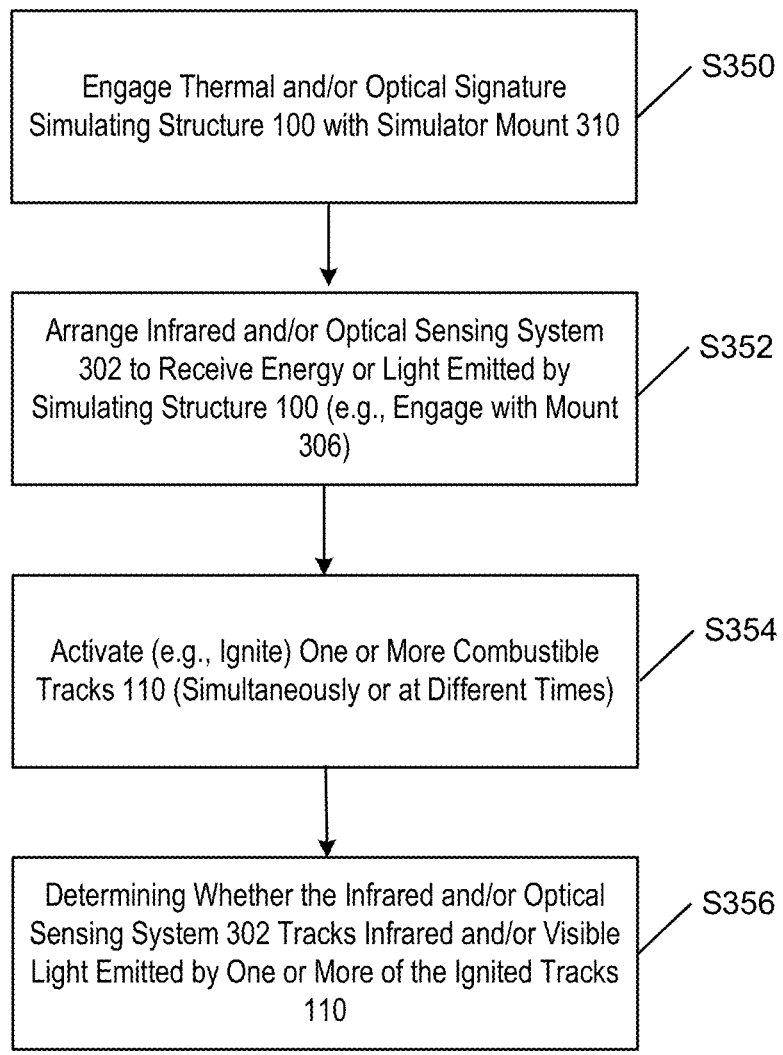

FIGS. 4A and 4B illustrate the example test system 300 in use, and FIG. 4C provides a flow chart showing some example steps of use of test system 300. As shown in these figures, the thermal and/or optical signature simulating structure 100 is engaged with the simulator mount 310 (Step S350) and the infrared and/or optical sensing system 302 is arranged to receive energy or light emitted by the thermal and/or optical signature simulating structure 100 (S352), e.g., engaged with mount 306. Steps S350 and S352 can take place in any desired order. One or more combustible track 110 is ignited (using igniter(s) 120, Step S354) thereby generating ignition front 220 that burns along the combustible track 110. As the combustible track 110 burns (shown by the changed positions of the ignition front 220 in FIGS. 4A and 4B), the simulator mount 310 (along with the components attached thereto) moves with respect to the sensing/tracking system 304 mount 306, as shown by arrow 308B in at least some examples of this technology.

As the ignition front 220 moves along the combustible track(s) 110 and the simulator mount 310 moves with respect to the mount 306, the output of sensing/tracking system 304 can be monitored to determine whether the sensing/tracking system 304 tracks and maintains the ignition front 220 within its field of view (Step S356). When: (a) the sensing/tracking system 304 corresponds to one used in a missile or other weapon, (b) the combustible track(s) 110 is (are) configured to mimic the path(s) of one or more countermeasures deployed from a vehicle (e.g., an aircraft), and (c) the distance D and track 110 composition and/or dimensions L, W, and T are chosen to provide realistic burn rates, thermal and/or optical signatures, and field-of-view sizes for a typical missile/countermeasure interaction, then a determination of whether the sensing/tracking system 304 actually tracks the ignition front 220 can provide information regarding the potential effectiveness of the countermeasure simulated. For example, if the sensing/tracking system 304 tracks movement of the ignition front 220 in the infrared and/or optical sensor test system 300 at Step S356, then: (a) a countermeasure manufacturer gets information indicating that the tested countermeasure properties and/or package (e.g., its track, burn rate, deployment timing, deployment sequence, etc.) have increased likelihood of being effective if deployed by an aircraft and/or (b) a missile or sensor manufacturer gets information indicating that their systems (e.g., the tracking system and/or guidance system hardware and/or software) may need improvement to accurately track and hit a target (e.g., to avoid being "fooled" by countermeasures). Thus, systems and methods according to aspects of this technology may allow countermeasure manufacturers and/or missile system manufacturers to test their systems under a variety of conditions (e.g., test several countermeasure patterns and/or packages or test against several countermeasure patterns and/or packages) without the time and/or expense of performing actual flights with live countermeasures.

The methods described above in conjunction with FIGS. 4A-4C may be widely varied without departing from this technology. For example, the methods may include steps of making the thermal and/or optical signature simulating structure 100 (e.g., by making the combustible material to be applied to the substrate; by printing or otherwise applying one or more combustible tracks 110 to a substrate 102; by engaging one or more igniters 120 with a substrate 102; by applying other combustible regions (described below) to a substrate 102; etc.). Additionally or alternatively, one or more of the steps may be omitted, such as the relative movement of the thermal and/or optical signature simulating structure 100 with respect to the infrared and/or optical sensing system 302. Additional and/or alternative steps and processes may be performed without departing from this technology, including any one or more of the steps and/or processes described in this specification in any combination.

Figure 5:
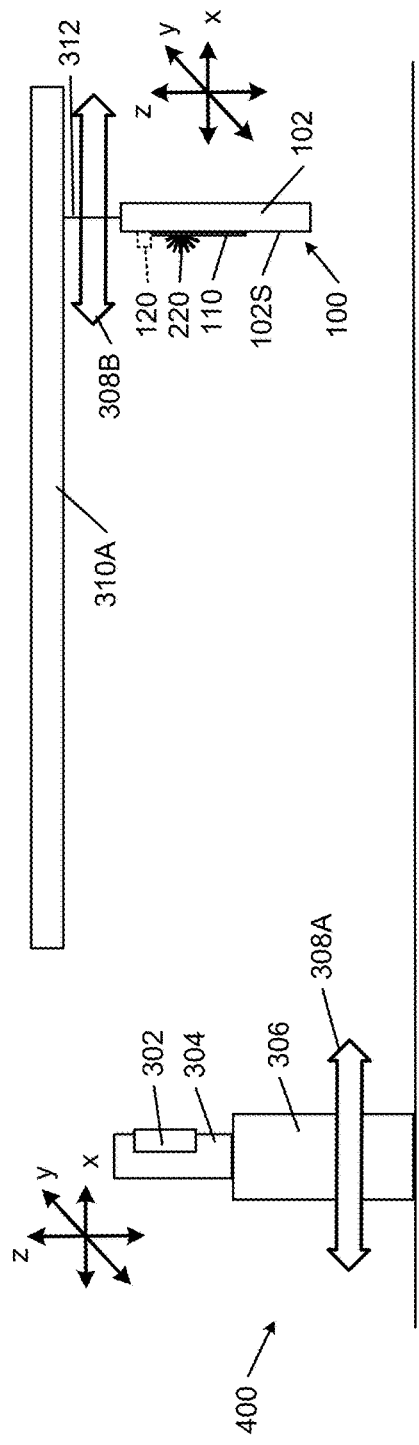

FIG. 5 illustrates another example infrared and/or optical sensor test system 400 (e.g., a countermeasure simulation system and/or test system) in accordance with some aspects of this technology. In this example, rather than a floor or ground based simulator mount 310 (as shown in FIGS. 3-4B), the thermal and/or optical signature simulating structure 100 (e.g., a countermeasure simulating structure) is suspended from a simulator mount 310A (e.g., an overhead mount structure), e.g., via one or more cables 312, brackets, braces, or the like. In test system 400, the thermal and/or optical signature simulating structure 100 may be moved in any of the x, y, and/or z directions, as represented by arrow 308B, e.g., by movement along the mount 310A, by extending or retracting cable(s) 312, etc. Additionally or alternatively, the mount 306 for the sensing/tracking system 304 also may be moved in any of the x, y, and/or z directions, as represented by arrow 308A.

Figure 6:
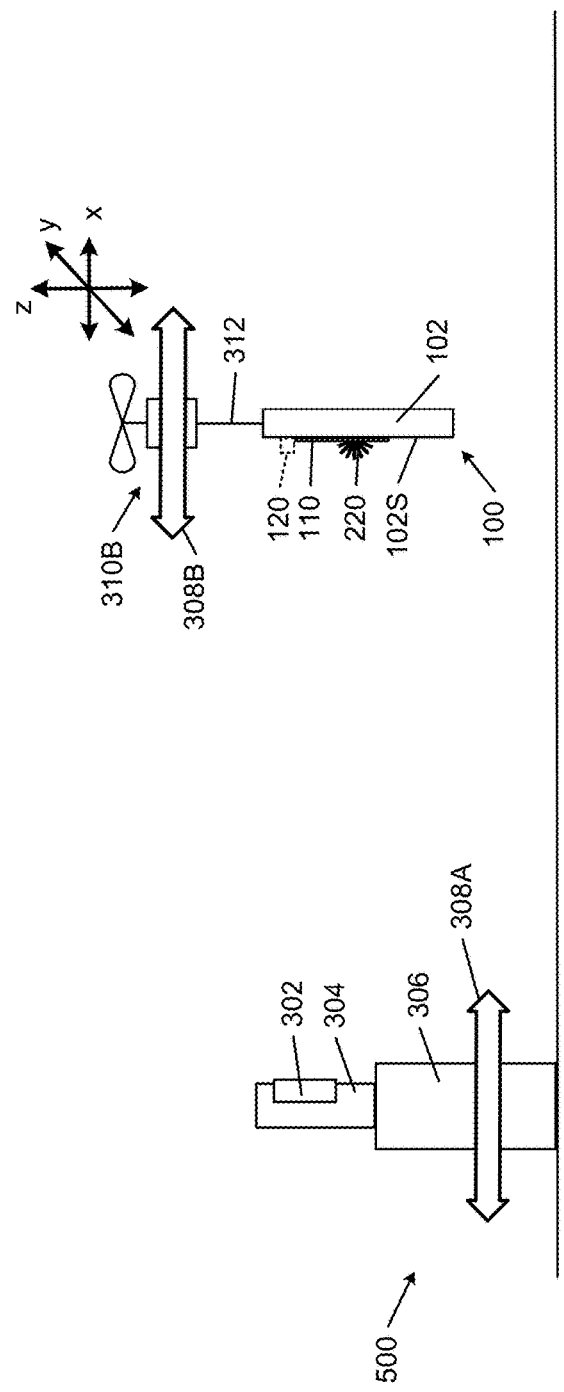

FIG. 6 illustrates another example infrared and/or optical sensor test system 500 (e.g., a countermeasure simulation system and/or test system) in accordance with some aspects of this technology. In this example, the thermal and/or optical signature simulating structure 100 (e.g., a countermeasure simulating structure) is suspended from a simulator mount 310B in the form of a drone, e.g., via one or more cables 312, brackets, braces, or the like. This drone based simulator mount 310B allows movement of the thermal and/or optical signature simulating structure 100 in any of the x, y, and/or z directions, as represented by arrow 308B. Additionally or alternatively, the mount 306 for the sensing/tracking system 304 also may be moved in any of the x, y, and/or z directions, as represented by arrow 308A.

As described above, some potential fields of use relating to this technology include: (a) systems and methods for testing optical and/or infrared tracking and/or guidance systems (e.g., employed by missiles or other weapons) and/or (b) systems and methods for testing the effectiveness of countermeasure systems or packages (e.g., employed by aircraft or other vehicles or "targets"). In such fields of use, advantageously the combustible track(s) 110 provided on the thermal and/or optical signature simulating structure 100 will burn in a manner such that, in the field of view of the infrared and/or optical sensing system 302, the combustible track(s) 110 burn to generally correspond with or to simulate the appearance of an actual countermeasure when deployed (e.g., so that, in the field of view of the infrared and/or optical sensing system 302, the ignition front 220: (a) moves at generally the same rate as a countermeasure flare moves, and/or (b) moves in generally the same path that a countermeasure flare moves, and/or (c) is of generally the same size when viewed by the sensor system 302, etc.).

In real use (e.g., combat) scenarios, a targeted aircraft (or other vehicle) typically will deploy a series of countermeasures in an effort to "distract" an approaching missile's tracking and/or guidance system and "fool" the missile into tracking and following the countermeasure rather than the targeted aircraft. Such real use situations typically involve deploying a countermeasure package including multiple countermeasure flares. These multiple flares may be deployed with predetermined trajectories and under predetermined timing and/or sequences designed to cause the tracking and/or guidance system to change its target from the aircraft to the countermeasure.

Figure 7A:
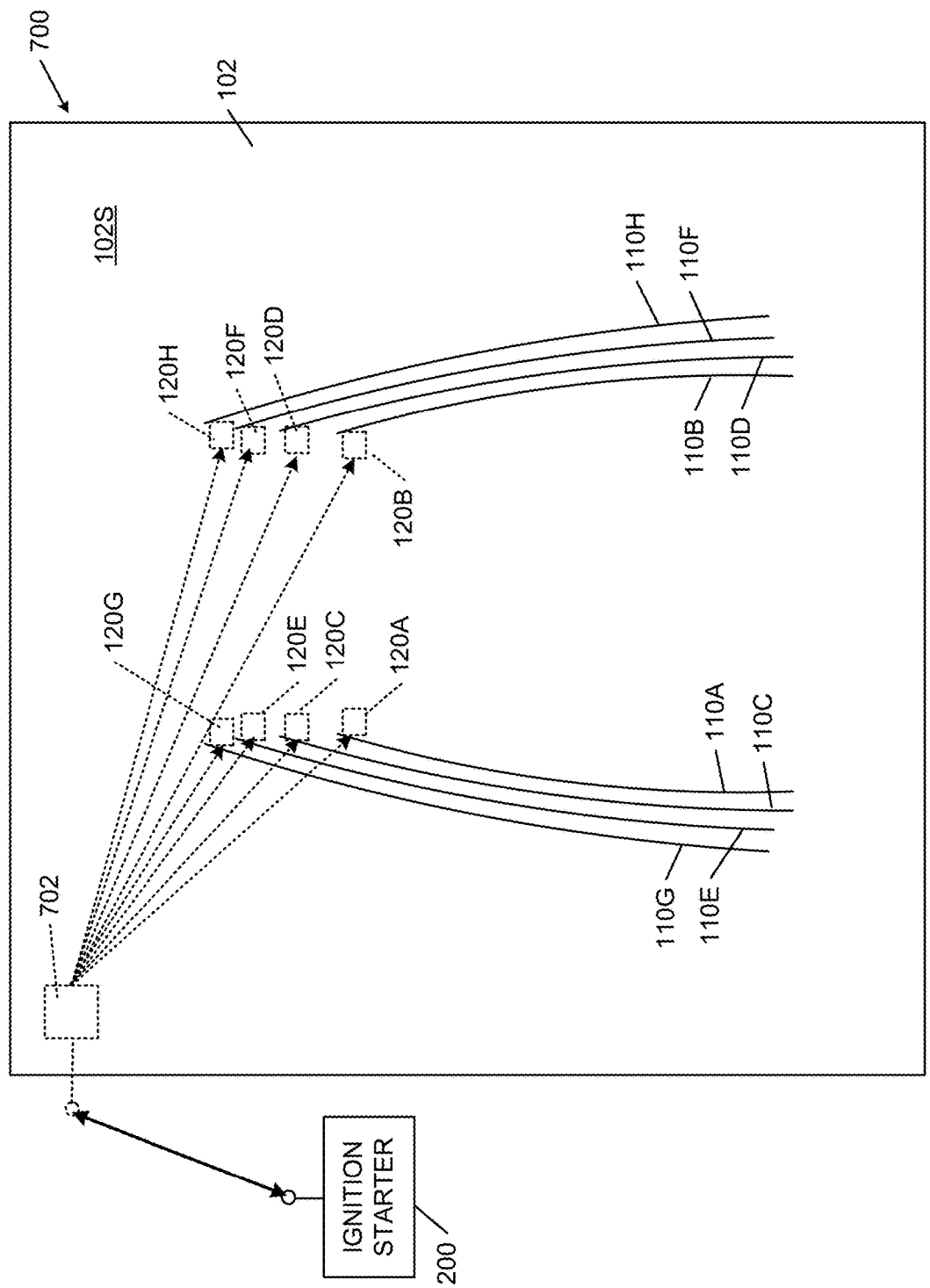
FIGS. 7A, 7B, and 8 illustrates examples of different combustible track patterns on a substrate and their combustion in accordance with some aspects of this technology.
Figure 7B:
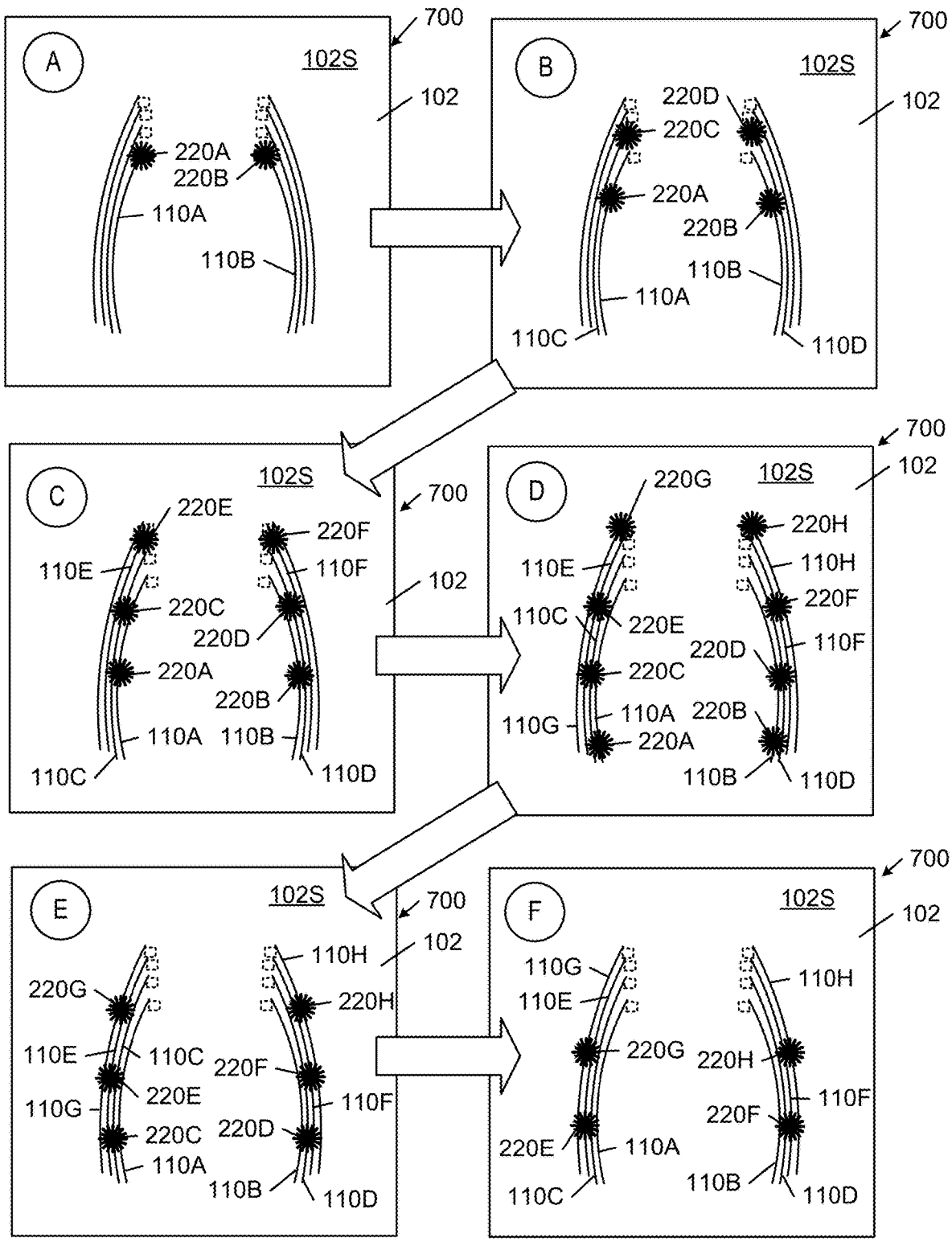

Thus, countermeasure simulating systems in accordance with aspects of this technology may be formed to include multiple combustible tracks 110 that are ignited under a timing and sequence to mimic a countermeasure package that deploys multiple flares. FIGS. 7A and 7B illustrate an example countermeasure simulation structure 700 (or other thermal and/or optical signature simulation structure) including multiple combustible tracks 110A-110H. The combustible tracks 110A-110H may be applied to a surface 102S of the base 102 in any of the various manners described above, e.g., by one or more of the printing processes described above. The tracks 110A-110H may be separated from one another such that they do not intersect along their lengths. The combustible tracks 110A-110H may be formed from the same composition (e.g., the same combustible material, the same binder (if a binder is present), the same combustible material concentration, etc.). Alternatively, one or more of the combustible tracks 110A-110H may differ in composition from one or more of the other combustible tracks 110A-110H (e.g., differ in the combustible material, differ in binder, differ in concentration of combustible material, etc.).

As some additional potential features, the combustible tracks 110A-110H on a single simulation structure 700 may be designed to produce the same thermal and/or optical signature when burned. Alternatively, if desired, one or more of the combustible tracks 110A-110H may be designed to produce a thermal and/or optical signature during combustion that differs from a thermal and/or optical signature produced by one or more of the other combustible tracks 110A-110H. This may be accomplished, for example, by changing one or more of: the combustible material, the binder, the concentration of the combustible material, and/or the dimensions of the track 110A-110H in one or more of the combustible tracks 110A-110H. The combustible tracks 110A-110H may be made from any suitable combustible materials, including the combustible materials described above.

FIG. 7A further shows that this example simulation structure 700 includes a plurality of igniters 120A-120H, one igniter for each combustible track 110A-110H. In this illustrated example simulation system 700, an ignition starter 200 (e.g., a remote and/or computer controlled device) interacts with a distributor 702, which in turn sends signals to the igniters 120A-120H in a desired sequence and/or timing to initiate combustion of the individual combustible tracks 110A-110H (e.g., akin to a distributor and/or computer controller of an automobile sending signals to spark plugs to initiate combustion in corresponding piston cylinders). While FIG. 7A shows a 1:1 ratio of igniters 120A-120H to combustible tracks 110A-110H, other arrangements are possible without departing from this technology. For example, a single igniter 120 could be provided and fired multiple times (under any desired timing and/or order) to initiate combustion of the individual combustible tracks 110A-110H. Alternatively, if desired, multiple igniters 120 may be present in the simulation system 700 wherein each igniter present is configured to initiate combustion of one or more combustible tracks 110A-110H (such as a left side igniter and a right side igniter). Any combination of the number of combustible tracks 110 and igniters 120 may be provided without departing from at least some examples of this technology. If desired, a separate distributor 702 device may be omitted, e.g., and signals directly from ignition starter (e.g., a computer controller) 200 could control the igniter(s) 120 and cause it/them to activate the combustible tracks 110.

FIG. 7B illustrates an example ignition sequence for the simulation structure 700 shown in FIG. 7A. The combustible tracks 110A-110H in this illustrated example are intended to generally mimic eight flash countermeasures deployed by dropping out of an aircraft (or other vehicle). Box A of FIG. 7B shows an initial ignition time when igniters 120A and 120B are activated by signals from ignition starter 200 (e.g., and distributor 702, if present) (see FIG. 7A). Igniters 120A and 120B may be activated simultaneously or in any order at any desired timing. Activation of igniters 120A and 120B generates ignition fronts 220A and 220B, respectively, on combustible tracks 110A and 110B, respectively. At this point in time, the ignition fronts 220A and 220B burning on combustible tracks 110A and 110B, respectively, on simulation structure 700 are intended to mimic the release of the first two countermeasures from an aircraft (or other vehicle).

Box B of FIG. 7B shows the status of the simulation structure 700 at a later point in time from Box A. By this time, ignition fronts 220A and 220B have burned and moved downward along combustible tracks 110A and 110B, respectively. Then, a second pair of igniters 120C and 120D are activated (simultaneously or staggered in time) by signals from ignition starter 200 (e.g., and distributor 702, if present) (see FIG. 7A). Activation of igniters 120C and 120D generates ignition fronts 220C and 220D, respectively, on combustible tracks 110C and 110D, respectively. At this point in time, the ignition fronts 220C and 220D burning on combustible tracks 110C and 110D, respectively, on simulation structure 700 are intended to mimic the release of two additional countermeasures from the aircraft (or other vehicle). Also, at this point in time, four ignition fronts (220A, 220B, 220C, and 220D) are burning simultaneously on the simulation structure 700.

Box C of FIG. 7B shows the status of the simulation structure 700 at a later point in time from Box B. By this time, ignition fronts 220A and 220B have burned and moved further downward along combustible tracks 110A and 110B, respectively, and ignition fronts 220C and 220D have burned and moved downward along combustible tracks 110C and 110D, respectively. Then, a third pair of igniters 120E and 120F are activated (simultaneously or staggered in time) by signals from ignition starter 200 (e.g., and distributor 702, if present) (see FIG. 7A). Activation of igniters 120E and 120F generates ignition fronts 220E and 220F, respectively, on combustible tracks 110E and 110F, respectively. At this point in time, the ignition fronts 220E and 220F burning on combustible tracks 110E and 110F, respectively, on simulation structure 700 are intended to mimic the release of two additional countermeasures from the aircraft (or other vehicle). Also, at this point in time, six ignition fronts (220A, 220B, 220C, 220D, 220E, and 220F) are burning simultaneously on the simulation structure 700.

Box D of FIG. 7B shows the status of the simulation structure 700 at a later point in time from Box C. By this time, ignition fronts 220A, 220B, 220C, and 220D have burned and moved further downward along their respective combustible tracks 110A, 110B, 110C, and 110D. Further, ignition fronts 220E and 220F have burned and moved downward along combustible tracks 110E and 110F, respectively. Then, a fourth pair of igniters 120G and 120H are activated (simultaneously or staggered in time) by signals from ignition starter 200 (e.g., and distributor 702, if present) (see FIG. 7A). Activation of igniters 120G and 120H generates ignition fronts 220G and 220H, respectively, on combustible tracks 110G and 110H, respectively. At this point in time, the ignition fronts 220G and 220H burning on combustible tracks 110G and 110H, respectively, on simulation structure 700 are intended to mimic the release of two additional countermeasures from the aircraft (or other vehicle). Also, at this point in time, eight ignition fronts (220A, 220B, 220C, 220D, 220E, 220F, 220G, and 220H) are burning simultaneously on the simulation structure 700.

Box E of FIG. 7B shows the status of the simulation structure 700 at a later point in time from Box D. At this time, ignition fronts 220A and 220B have reached the end of their respective combustible tracks 110A, 110B and have burned out. The other ignition fronts 220C, 220D, 220E, 220F, 220G, and 220H continue burning down their respective tracks 110C, 110D, 110E, 110F, 110G, and 110H. Similarly, Box F of FIG. 7B shows a still later point in time from Box E. At this time, ignition fronts 220C and 220D have reached the end of their respective combustible tracks 110C, 110D and have burned out. The other ignition fronts 220E, 220F, 220G, and 220H continue burning down their respective tracks 110E, 110F, 110G, and 110H. These ignition fronts 220E, 220F, 220G, and 220H will continue burning down their respective tracks 110E, 110F, 110G, and 110H until they reach the track ends and burn out (not shown in FIG. 7B).

The simulation structure 700 of FIGS. 7A and 7B includes combustible tracks 110A-110H intended to mimic the paths of countermeasures deployed from an aircraft using a gravity drop in which the countermeasure ignites and flares soon after its release. Other track shapes may be employed, e.g., depending on the path of an object being simulated. As some examples, the track paths may be linear shaped, curved, parabolic arcs, cycloid shaped, shaped as two-dimensional projections of helixes and starbursts, etc.

Figure 8:
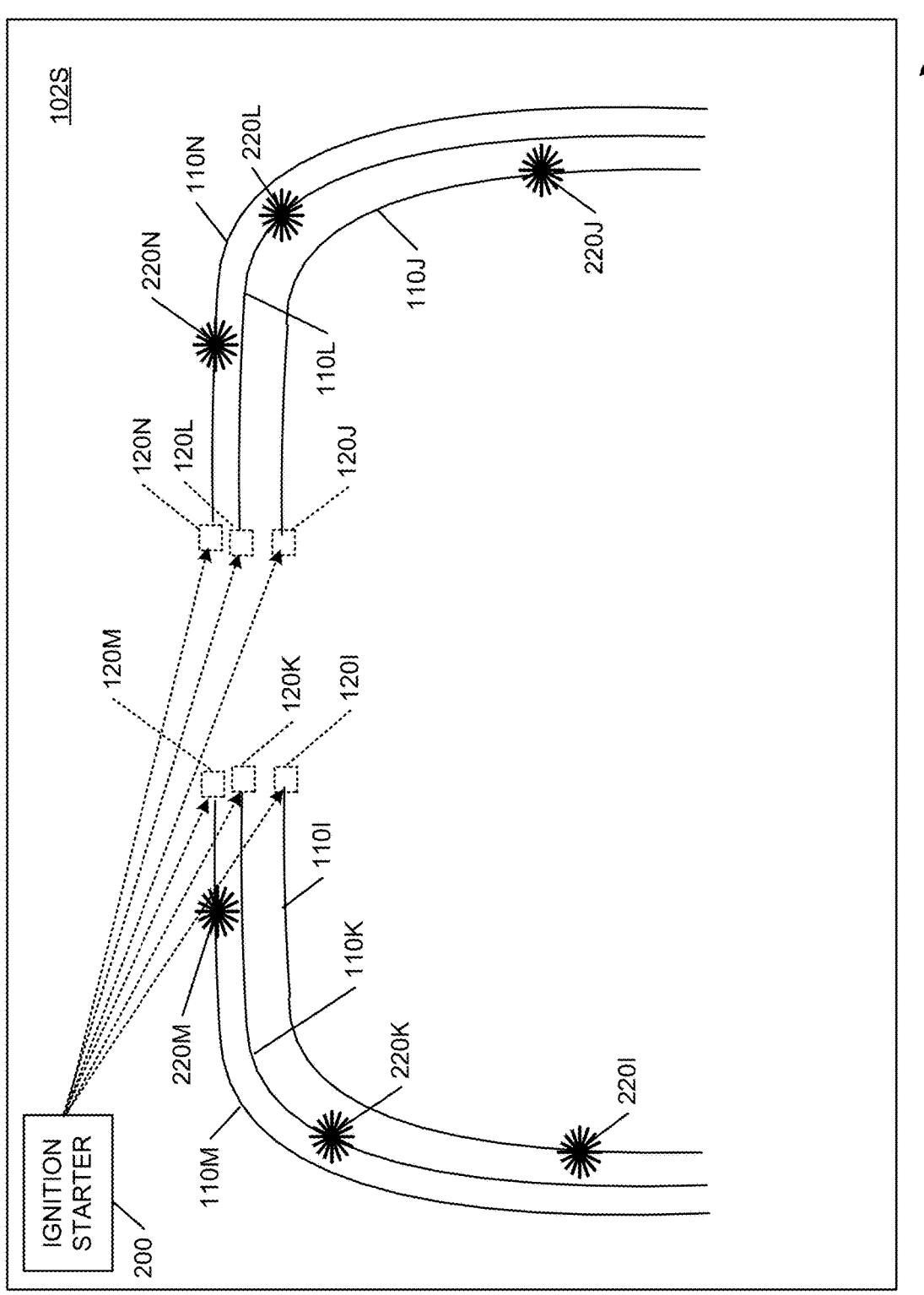

FIG. 8 shows another example simulation structure 800 intended to mimic some countermeasure packages. In some instances, an aircraft will deploy several countermeasures in rapid succession by ejecting them outward (e.g., sideways) from the flying aircraft. FIG. 8 shows six combustible tracks 110I, 110J, 110K, 110L, 110M, and 110N on a simulation structure 800 intended to mimic such countermeasure deployment. These combustible tracks 110I, 110J, 110K, 110L, 110M, and 110N are applied to base surface 102S to first extend sideways from their respective origins and/or igniters 120I, 120J, 120K, 120L, 120M, and 120N (to mimic the sideways ejection of actual countermeasures from an aircraft or other vehicle) and then curve downward (to mimic the eventual gravity fall of the countermeasures through the air). FIG. 8 further shows a time when six ignition fronts 220I, 220J, 220K, 220L, 220M, and 220N are burning simultaneously (e.g., ignited in a time shifted manner as described above in conjunction with FIGS. 7A and 7B). While FIG. 8 shows an ignition starter 200 on the base 102 interacting directly with each of the igniters 120I, 120J, 120K, 120L, 120M, and 120N, any types, numbers, and/or arrangements of ignition starters 200, distributors 702, and/or igniters 120 may be used in different specific examples of this technology.

As described above, an ignition front 220 burns to move along its respective combustible track 110. The burn rate of the combustible material, and hence the speed at which an ignition front 220 moves down its track 110, can be controlled and altered in various ways. For example, the following factors may affect combustible material and/or combustible track 110 burn rates: different combustible material compositions (e.g., different thermite materials); the presence or absence of binder materials; the composition of any present binder material; the concentration of combustible material within the binder and/or other components; the physical dimensions of the combustible material and/or the combustible track 110; etc. Different combustible materials also may produce different thermal and/or optical signatures (e.g., different thermal images, different flare colors, etc.) when burnt, e.g., depending on the example factors described above. Thus, one can substantially vary and/or control burn rates and/or thermal and/or optical signatures produced by the combustible materials and/or combustible tracks 110 in simulation systems in accordance with some examples of this technology.

Figure 9:
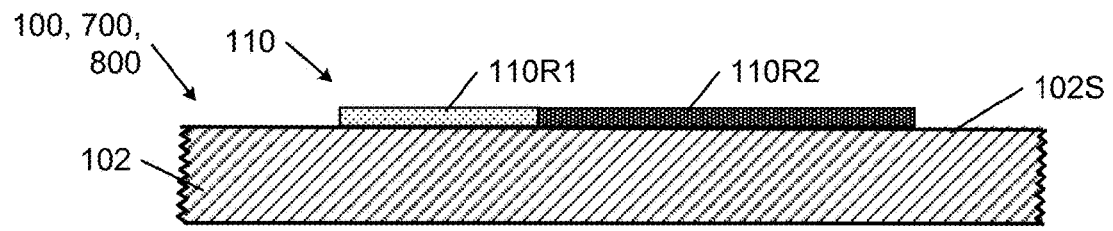
FIG. 9 illustrates example features of a multi-material combustible track.

Additionally or alternatively, in at least some examples of this technology, a single continuous combustible track 110 may have portions with different burn rates, different thermal and/or optical signatures, and/or other different burn characteristics. FIG. 9 illustrates an example. This figure shows a cross-sectional view of a simulation structure 100, 700, 800 similar to the cross-sectional view of FIG. 1B, but this cross-section is taken along a surface parallel to the length direction of a combustible track 110 (so that the cross-section extends along the longitudinal length of a combustible track 110). As shown, one portion 110R1 (e.g., one end) of combustible track 110 is made from a first combustible material and another portion 110R2 (e.g., the other end) is made from a second (and different) combustible material. The two portions 110R1 and 110R2 meet and form a single, continuous combustible track 110. Portion 110R1 may produce a different burn rate and/or a different thermal and/or optical signature than portion 110R2. This may be accomplished in various ways. For example: (a) the combustible material (e.g., thermite material) in portion 110R1 may differ from the combustible material (e.g., thermite material) in portion 110R2; a binder material used in portion 110R1 may differ in composition from the binder material used in portion 110R2; the concentration of combustible material (e.g., thermite material) in binder material in portion 110R1 may differ from the concentration of combustible material (e.g., thermite material) in the binder material in portion 110R2; etc. These factors may change one or more of: the ignition front 220 movement rate along a track, the heat released during the burn, the color of the ignition front 220, the size of the ignition front 220, etc.

Figure 10:
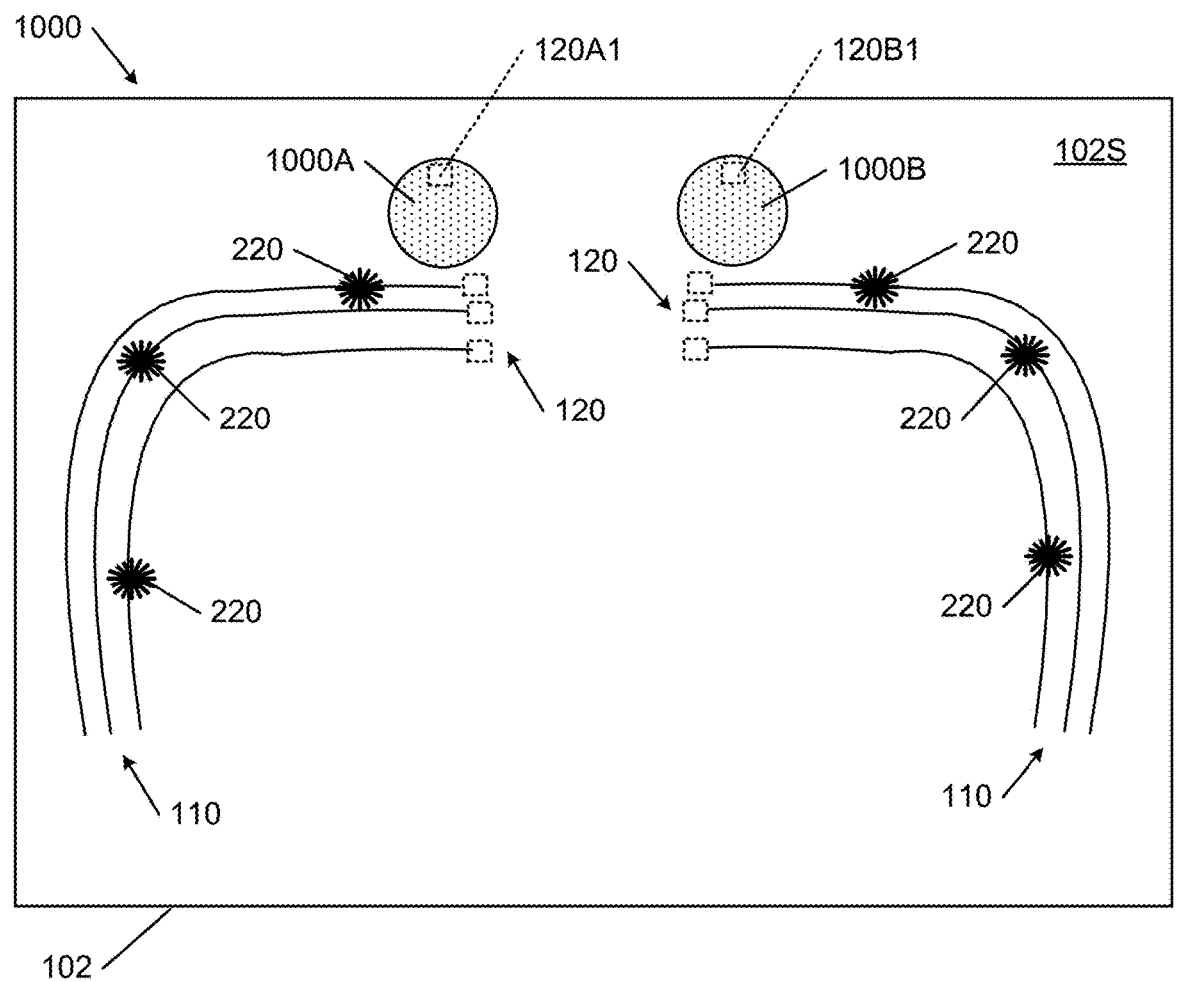
FIGS. 10 and 11 illustrate additional examples of different combustible track patterns on a substrate and their combustion in accordance with aspects of this technology.

Other ways of making features of thermal and/or optical signature simulation systems (including countermeasure simulation systems) appear more "realistic" from the point of view of a sensor system 302 may be provided. As an example, as noted above, when used as a countermeasure simulation system, the combustible track(s) may be shaped to simulate the manner in which aircraft (or other vehicles) deploy their countermeasure(s). In actual use, before the countermeasures are deployed, the missile tracking and/or guidance system may view (and optionally "lock on" to) the thermal and/or optical signature of the jet engine (e.g., its exhaust). In the example simulation system 1000 of FIG. 10, in addition to combustible tracks 110 to mimic countermeasure deployment, one or more other combustible regions 1000A, 1000B have been applied to the surface 102S of the base 102 (e.g., by printing, by painting, by coating, by dipping, etc.). These combustible regions 1000A, 1000B also burn to produce a thermal and/or optical signature, although the thermal and/or optical signature may be designed to mimic exhaust from an aircraft engine (and to differ from the thermal and/or optical signature(s) produced by the combustible track(s) 110). As some more specific examples, the combustible regions 1000A, 1000B may include combustible material that burns less hot and/or at a slower rate than the combustible track(s) 110 mimicking the countermeasures. FIG. 10 shows the combustible regions 1000A, 1000B separated from the combustible tracks 110, e.g., so that ignition of one or more of the combustible regions 1000A, 1000B does not inadvertently ignite one or more of the combustible track(s) 110 and/or so that ignition of one or more of the combustible track(s) 110 does not inadvertently ignite one or more of the combustible regions 1000A, 1000B. Also, while FIG. 10 shows combustible tracks 110 similar to the combustible tracks 110I-110N shown in FIG. 9, any desired number, shapes, and/or arrangements of combustible tracks 110 may be used without departing from at least some examples of this technology. Also, any desired number, shapes, and/or arrangements of combustible regions 1000A and/or 1000B may be provided on a base 102, e.g., depending on the object being simulated by region(s) 1000A, 1000B. The combustible regions 1000A, 1000B may or may not have the characteristics of a "track" over at least some portion of their area.

In one example use, the simulation system 1000 and an optical and/or thermal sensing system (e.g., of the type used on a missile or other weapon) are mounted in a test system, e.g., like those illustrated in FIGS. 3-6. An ignition system in communication with igniters 120A1 and 120B1 may ignite combustible regions 1000A, 1000B, respectively, causing them each to burn in a manner to mimic jet engine exhaust (from two jet engines) viewed from the rear (as often is the case when a jet is targeted by a missile). These combustible regions 1000A, 1000B may be structured and designed to provide a relatively long burn time. At an appropriate time (e.g., when, before, or after the optical and/or infrared sensing system (e.g., of the missile system in the test) locks onto the heat and/or optical signature from one or both combustible regions 1000A, 1000B), an ignition system will activate the igniters 120 for one or more combustible tracks 110, thereby generating the ignition front(s) 220. The igniters 120 may be activated in any desired manner and/or in any desired timing, e.g., to mimic deployment of a countermeasure package. Throughout the simulated countermeasure deployment, the optical and/or infrared guidance and/or tracking system of the missile can be monitored to see if its sensors 302 remain locked on either or both of combustible regions 1000A, 1000B or to see if its sensors 302 follow one or more of the ignition fronts 220. In this manner, one can perform various tests, e.g., including: (a) test if a missile guidance and/or tracking system can maintain the simulated jet exhaust as a target despite the deployment of the simulated countermeasures package; and/or (b) test if a simulated countermeasure package can effectively protect a vehicle and its occupants; etc.

Figure 11:
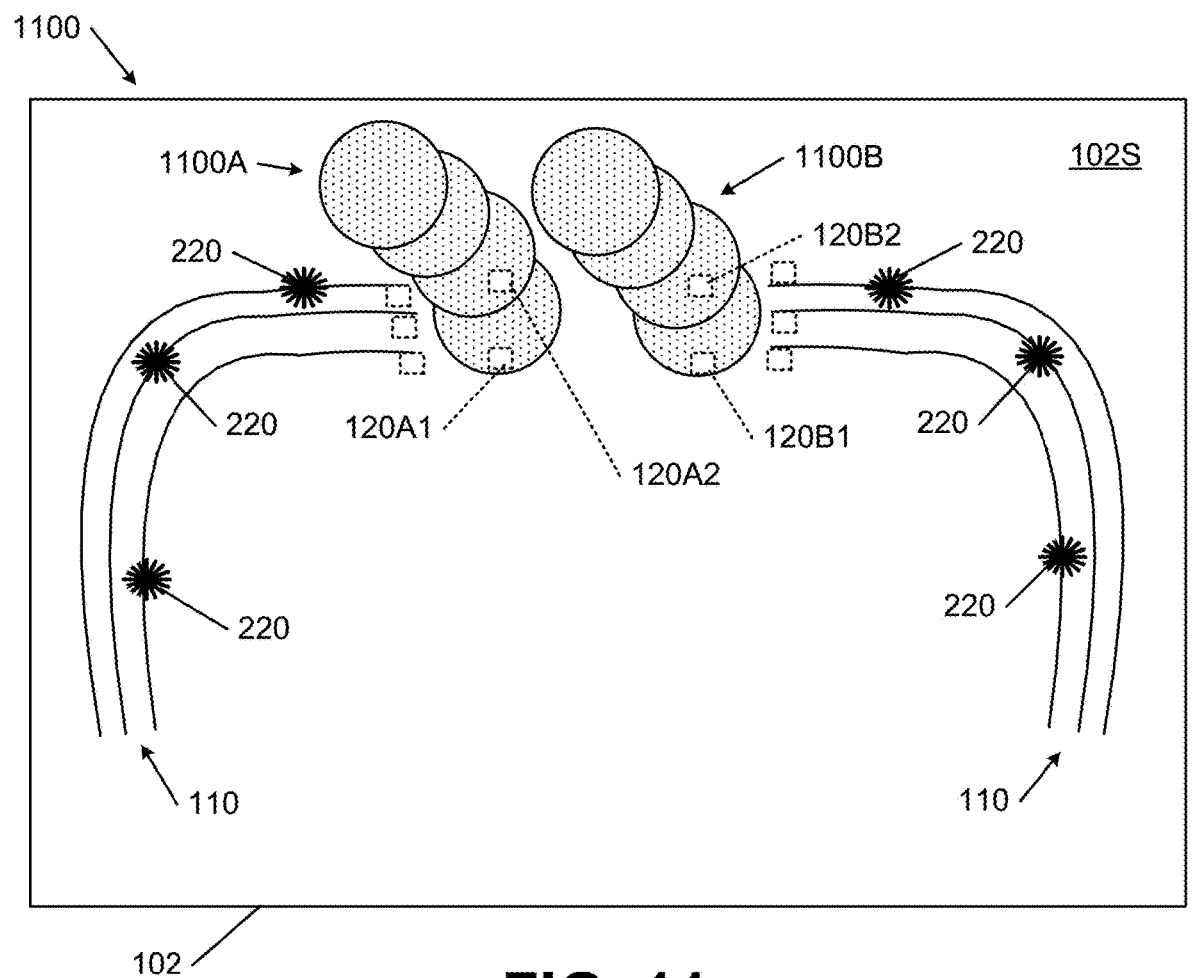

Systems and methods in accordance with at least some aspects of this technology may provide additional information to their users. FIG. 11 shows a simulation system 1100 similar to that shown in FIG. 10, but the combustible regions differ (1100A and 1100B of FIG. 11 v. 1000A and 1000B of FIG. 10). In addition to the simulations described above, the simulation system 1100 of FIG. 11 additionally allows for simulation of an evasive maneuver performed by the vehicle pilot. Typically, when a pilot becomes aware that his/her vehicle has become a missile target, he/she will launch countermeasures and take appropriate evasive action in an effort to avoid the missile. In the FIG. 11 simulation system 1100, combustible regions 1100A and 1100B are elongated to mimic the pilot performing an upward and leftward evasive maneuver. If necessary, additional area of combustible regions 1100A, 1100B may be equipped with additional igniters 120A2, 120B2, e.g., to control the timing as to when the maneuver simulation is activated. During the simulation (e.g., in a system like those shown in FIGS. 3-6), one can determine whether the sensing system (e.g., infrared and/or optical sensing system 302), guidance system, and/or tracking system involved in the test maintains tracking (or lock on) of combustible regions (1100A and/or 1100B) and/or whether the sensing system, guidance system, and/or tracking system involved in the test begins tracking one of ignition fronts 220 of a combustible track 110. By applying different patterns of combustible regions (e.g., 1100A, 1100B), different evasive maneuvers may be tested in combination with different countermeasure deployments and packages to determine candidate combinations of actions and countermeasure properties to develop and test in more detail as missile avoidance techniques.

Figure 12A:
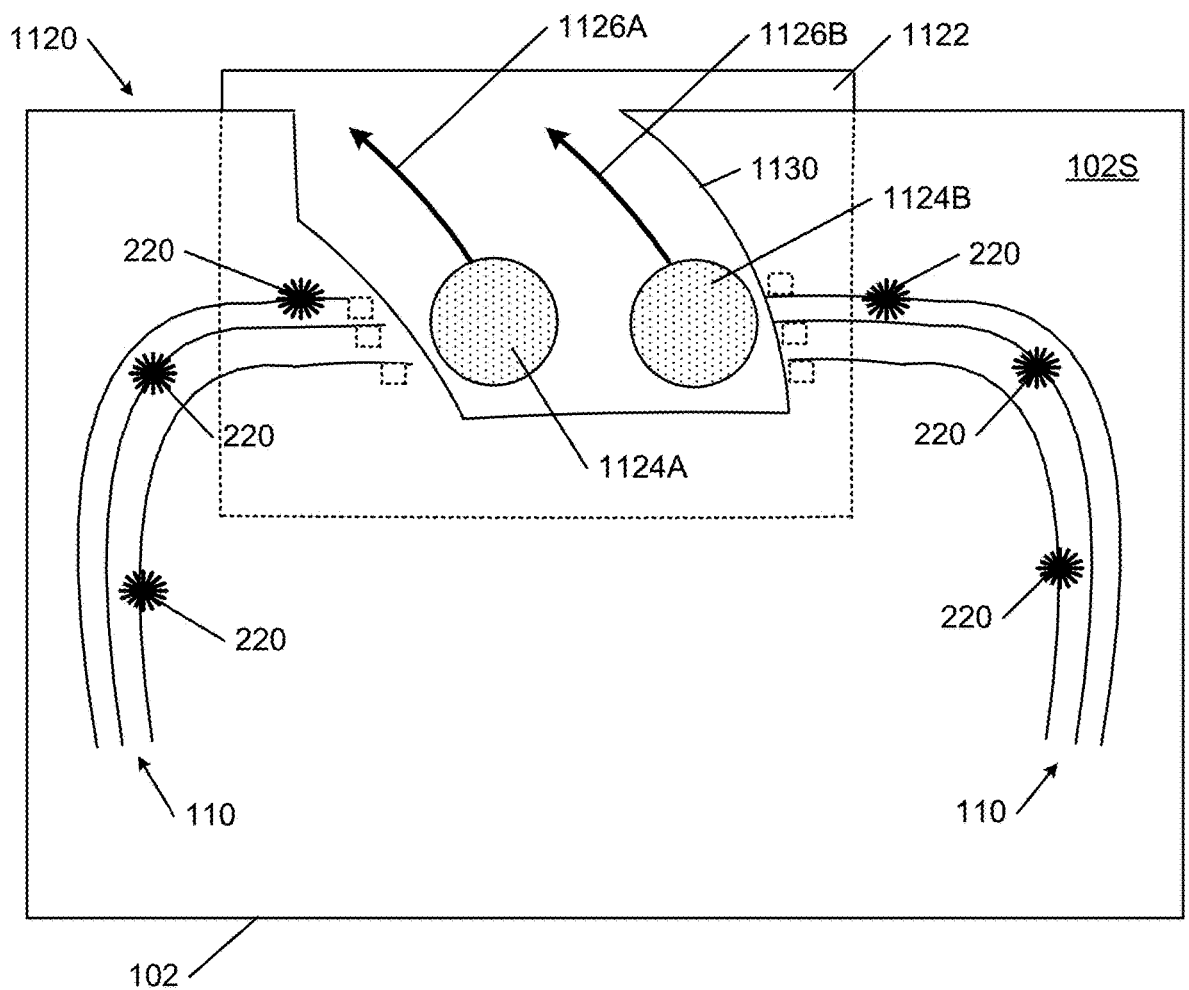
FIGS. 12A and 12B illustrate an example thermal and/or optical signature simulating structure and/or system (e.g., a countermeasure simulating structure and/or system) in accordance with aspects of this technology.
Figure 12B:
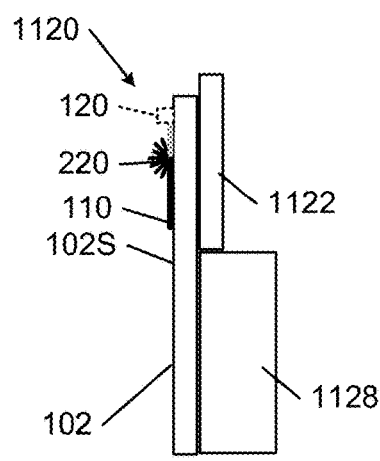

FIGS. 10 and 11 illustrate example simulation systems in which vehicle exhaust and vehicle evasive maneuvers are simulated using combustible material printed onto the surface 102S of the base 102. Other ways of simulating the presence of vehicle exhaust and/or vehicle evasive maneuvers along with the countermeasure track(s) are possible in accordance with some examples of this technology. FIGS. 12A and 12B illustrate an example simulation system 1120 that uses one or more combustible tracks 110 printed on a base 102, e.g., like any of those described above in conjunction with FIGS. 1A-2 and 7A-11. In the simulation system 1120 of FIGS. 12A and 12B, however, one or more exhaust plumes from the vehicle's engine(s) is/are simulated using an infrared projector screen 1122. FIG. 12A illustrates these simulated exhaust plumes at reference number 1124A, 1124B. Using this simulation system 1120, the infrared screen projector 1122 can simulate long term thermal signatures (such as the aircraft engine exhaust) while the combustible tracing(s) 110 simulate countermeasure deployment, as described above. In some examples of this aspect of this technology, vehicle motion (including potential evasive maneuvers) may be simulated by motion of the exhaust plumes 1124A, 1124B displayed on the infrared screen projector 1122. An example of this motion is depicted in FIG. 12A by arrows 1126A, 1126B. Simulated motion of the exhaust plumes 1124A, 1124B on the infrared screen projector 1122 may be computer controlled and/or coordinated with ignition of the combustible track(s) 110 to provide a desired combination of countermeasure deployment package and simulated evasive maneuvers within the field of view of the sensor system 302.

Any way of mounting the simulation system 1120 components may be used in accordance with this technology. In the illustrated example, an opening 1130 is formed in the base 102, and the infrared screen projector 1122 is mounted so that at least a portion thereof is located within and/or visible to the sensing system 302 (e.g., of the types shown in FIGS. 3-6) through this opening 1130. FIG. 12B shows the infrared screen projector 1122 supported by a support base 1128. Support base 1128, when present, also may support the base 102 on which the combustible track(s) 110 are provided. Support base 1128 also could be used and/or moved, for example, in any of the various systems and/or manners described in conjunction with FIGS. 3-6. Rather than providing an opening 1130, the infrared screen projector 1122 may be mounted in any desired manner so that the simulated exhaust plumes 1124A, 1124B are properly positioned with respect to the combustible track(s) 110 to simulate the vehicle exhaust (e.g., so that the simulated exhaust plumes 1124A, 1124B are located proximate to one or more of the combustible track(s) 110, located immediately above the base 102 near one or more tracks 110, etc.).

Figure 12C:
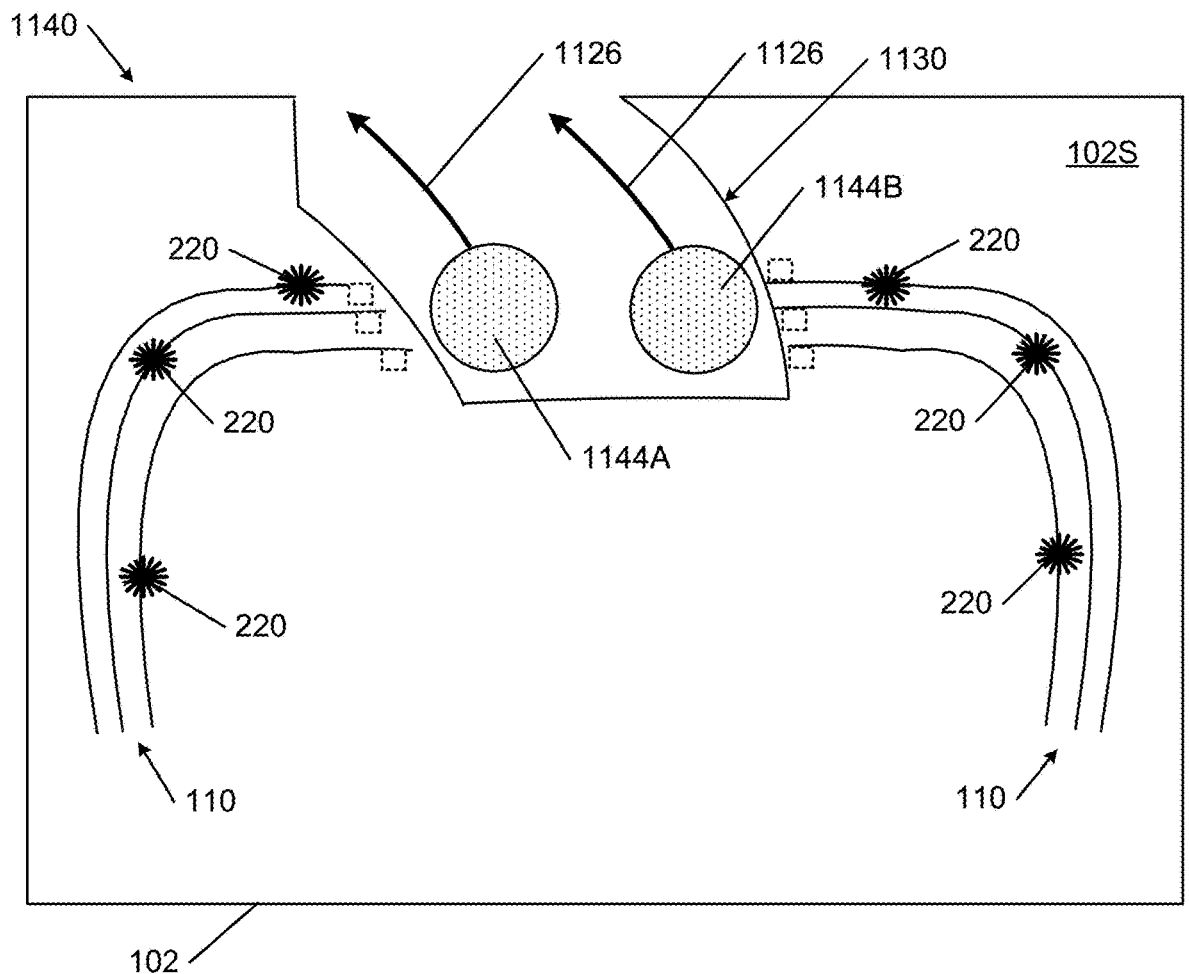
FIGS. 12C and 12D illustrate another example thermal and/or optical signature simulating structure and/or system (e.g., a countermeasure simulating structure and/or system) in accordance with aspects of this technology.
Figure 12D:
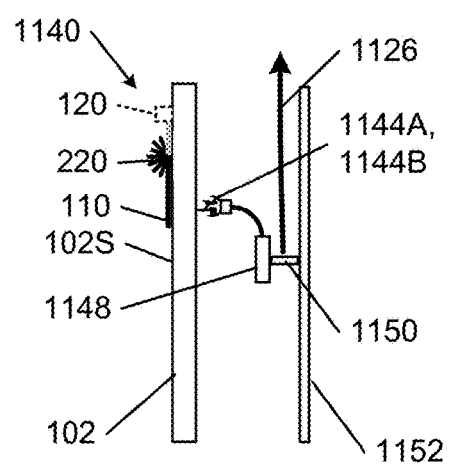

FIGS. 12C and 12D illustrate another example simulation system 1140 in which the presence of vehicle exhaust and/or vehicle evasive maneuvers is/are simulated along with simulated countermeasure track(s) 110 and deployment. In the example of FIGS. 12C and 12D, the vehicle exhaust is simulated by a combustible gas or plasma (shown at reference numbers 1144A and 1144B in FIGS. 12C and 12D). While other options are possible, FIG. 12D shows the combustible gas or plasma 1144A, 1144B generated by one or more torches 1148 (e.g., an acetylene torch, a propane torch, etc.). Using this simulation system 1140, the torch(es) 1148 can simulate long term thermal signatures (such as the aircraft engine exhaust) while the combustible tracing(s) 110 simulate countermeasure deployment, as described above. In some examples of this aspect of this technology, vehicle motion (including potential evasive maneuvers) may be simulated by actual physical motion of the torch(es) 1148. An example of this motion is depicted in FIGS. 12C and 12D by arrows 1126.

Any way of mounting the simulation system 1140 components may be used in accordance with this technology. In the illustrated example, an opening 1130 is formed in the base 102, and the torch(es) 1148 may be mounted so that the combusting gas or plasma 1144A, 1144B is located within and/or visible to the sensing system 302 (e.g., of the types shown in FIGS. 3-6) through this opening 1130. Rather than providing an opening 1130, the torch(es) 1148 may be mounted in any desired manner so that the simulated exhaust plumes formed by the gas or plasma 1144A, 1144B are properly positioned with respect to the combustible track(s) 110 to simulate the vehicle exhaust (e.g., so that the gas or plasma 1144A, 1144B is located proximate to one or more of the combustible tracks 110, located in front of the base 102, located immediately above the base 102 near one or more tracks 110, etc.).

FIG. 12D shows the torch(es) 1148 mounted on a movable arm 1150. The arm 1150 may move along a rail or track, e.g., provided on a support base 1152, to simulate motion of the vehicle and/or evasive maneuvers performed by the vehicle pilot. Support base 1152 also may support the base 102 on which the combustible track(s) 110 are provided. Support base 1152 also could be used and/or moved, for example, in any of the various systems and/or manners described in conjunction with FIGS. 3-6. Motion of the torch(es) 1148 may be computer controlled and/or coordinated with ignition of the combustible track(s) 110 to provide a desired combination of countermeasure deployment package and simulated evasive maneuvers within the field of view of the sensor system 302.

While FIGS. 12A-12D illustrate simulation systems 1120, 1140 in which the countermeasure tracks 110 correspond to those described in FIGS. 10 and 11, those skilled in the art given benefit of this disclosure, however, will appreciate that any desired countermeasure track shapes, track numbers, and/or deployment/combustion sequencing and/or any desired evasive maneuver motion simulation may be used in different specific examples of this technology.

Figure 13:
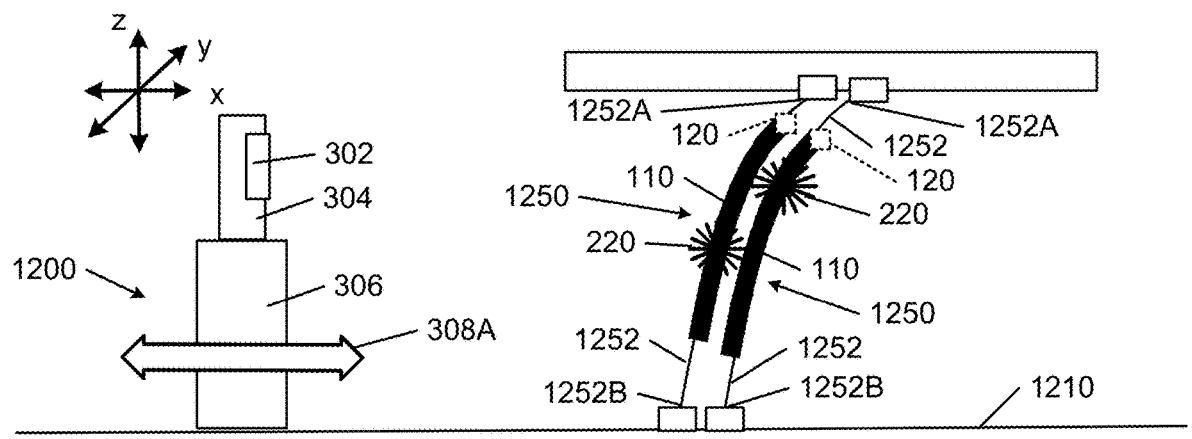
FIG. 13 illustrates features and use of another example infrared and/or optical test system in accordance with some aspects of this technology.

FIG. 13 illustrates a simulation test system 1200 that uses a simulation structure 1250 in which a combustible material is applied to one or more wire bases 1252. This may be accomplished, for example, by applying the combustible material (e.g., as a slurry) to a wire base 1252 to form a thickened combustible track 110 on the wire base 1252. The wire base 1252 may be shaped to simulate the path of the thermal and/or optical source being tested (e.g., to simulate a true three-dimensional path of a countermeasure flare when deployed). In the illustrated example of FIG. 13, one end 1252A of the wire base 1252 is anchored at an overhead location and the other end 1252B is anchored at the ground or floor 1210. The wire base 1252 may be shaped so that its lower portions are located closer (in the x-direction or horizontal direction of FIG. 13) to the infrared and/or optical sensor 302 involved in the test than its upper portions, e.g., to simulate a missile getting closer to its target over time. If necessary, one or more additional intermediate supports (e.g., wires supported overhead or from the side, etc.) may be provided between ends 1252A and 1252B to maintain the combustible track 110 in a desired shape. Additionally or alternatively, as shown by arrow 308A in FIG. 13, the mount 306 or other part of the simulation system 1200 could move with respect to wire base(s) 1252 (see arrow 308A) to simulate sensor (e.g., missile) approach to its target. This simulation structure 1250 allows relatively easy variation and/or modification in the combustible track 110 shape.

Rather than apply a combustible material to a separate wire base 1252 component, if desired, the entire combustible track 110, including its end support areas 1252A and 1252B, could be formed as a one-piece construction, e.g., by printing. In such systems, the ends 1252A and/or 1252B and/or some portion of the thickness of the combustible track 110 may be made from a less combustible or non-combustible material so that the combustible track 110 holds its shape and maintains its structural integrity during the burn. When printed, conventional and non-combustible print media material may be used for the ends 1252A and/or 1252B and/or for some portion of the thickness of the combustible track 110 to serve as the structure maintaining elements of the simulation structure 1250.

Figure 14:
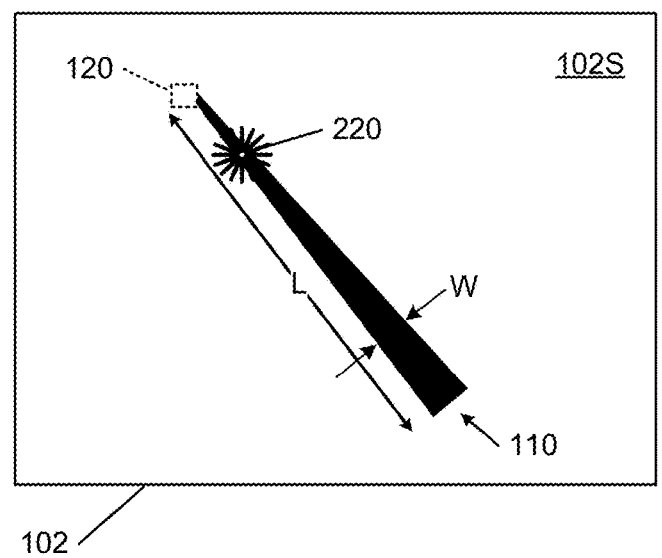
FIG. 14 illustrates example features of a combustible track to simulate motion between the track and a sensor viewing the track.

In the simulation systems described above, various ways of providing actual motion and/or simulating motion between the sensor 302 and simulating structure 100, 700, 800, 1000, 1100, 1120, 1140, 1250 are described (e.g., actual movement of one or more of mounts 306 and 310, movement of simulation structure 100 along a fixed mount (e.g., 310A), movement of simulation structure 100 using drone 310B, combustible track 110 shape, etc.). Additionally or alternatively, the system 1200 of FIG. 13 simulates this motion at least in part by the three-dimensional shape of wire base 1252 and its orientation with respect to the sensor 302. FIG. 14 illustrates another example of a manner for potentially simulating a change of distance between the sensor system (e.g., sensor 302 of FIGS. 3-6 and 13) and the simulation structure (e.g., 100, 700, 800, 1000, 1100, 1120, 1140, 1250). In this example, the width dimension W of the combustible track 110 changes over its length L. When burnt, the combustion front 220 will change in size—increasing in size if burnt from top to bottom (simulating a smaller separation between the sensor 302 and the target) or decreasing in size if burnt from bottom to top (simulating a larger separation between the sensor 302 and the target).

Figure 15:
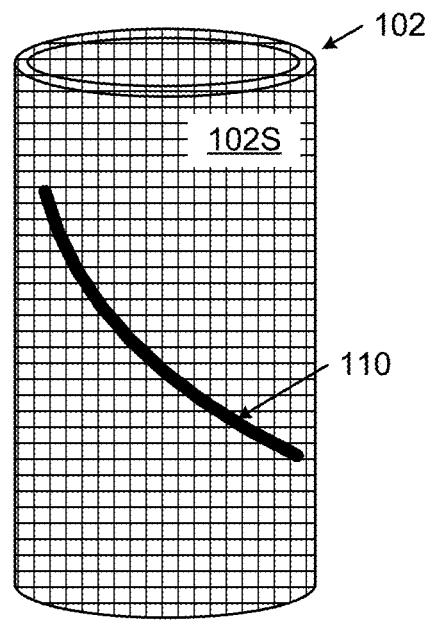
FIGS. 15 and 16 illustrate thermal and/or optical signature simulating structures on three-dimensional bases in accordance with some aspects of this technology.
Figure 16:
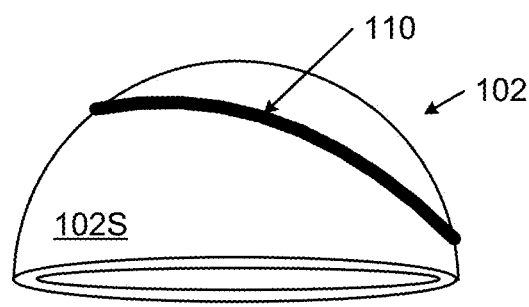

In still other examples of aspects of this technology, a combustible track 110 may be printed or otherwise applied to a base 102 having a surface 102S with three-dimensional characteristics. FIG. 15 illustrates a cylindrical base 102 in which a combustible track 110 is applied to the exterior cylinder surface 102S. While FIG. 15 shows the base 102 formed as a wire mesh, a solid cylinder base 102 may be used in some examples of this technology. Similarly, FIG. 16 illustrates a combustible track 110 applied to the exterior surface 102S of a hemispherical base 102. The combustible track(s) 110 of FIGS. 15 and 16 may be applied by printing, coating, painting, dipping, as a paste, etc., in some examples of this technology. Any number of combustible tracks 110 and/or any variations in the combustible track features described above may be incorporated into the examples of FIGS. 15 and 16 in different examples of this technology. The combustible track(s) 110 on surfaces 102S of FIGS. 15 and 16 may be applied (e.g., printed) in patterns that simulate three-dimensional trajectories of flares and countermeasures (e.g., lines, parabolic arcs, cycloids, helixes, starbursts, random and arbitrary patterns, etc.). Testing procedures of the types described above in conjunction with FIGS. 3-11 also may be used with three-dimensional bases 102, e.g., of the types shown in FIGS. 15 and 16.

Thus, as described above, at least some examples of this technology may provide an alternative to live fire or screen projection based testing of infrared and/or optical sensors (e.g., used by weapons systems, such as on missiles) at a fraction of the cost. Further, at least some examples of this technology may be made portable and can easily be brought to a test sensor (e.g., brought to the location of a weapon, such as a missile) versus the test sensor (e.g., with attached missile) needing to be brought to a specialized test facility or test location. Further, aspects of this technology allow easy testing of non-standard and/or arbitrary trajectories with true thermal and/or optical signatures of flares and countermeasures. These abilities are not possible with either live fire or screen projection based testing.

Aspects of this technology have been described above primarily with respect to potential use in (a) testing the effectiveness of countermeasures and countermeasure packages (optionally in combination with simulated vehicular evasive maneuvers) with respect to specific weapon guidance and/or tracking systems and (b) testing the effectiveness of weapon guidance and/or tracking systems against specific countermeasures and countermeasure packages (optionally in combination with simulated vehicular evasive maneuvers). Other potential uses also are possible. For example, one or more combustible tracks 110 may be formed with dimensions and track shapes that, when burned and viewed from the point of view of the sensor location (e.g., sensor 302 on sensor mount 306) form one or more paths that simulate movement of one or more nuclear missiles when launched and/or otherwise in motion. Such systems (e.g., like systems 300, 400, 500, 1200) may be used to test effectiveness of missile launch sensors used in satellites to quickly and accurately detect a launch. As another example, one or more combustible tracks 110 may be formed with dimensions and track shapes that, when burned and viewed from the point of view of the sensor location (e.g., sensor 302 on sensor mount 306) form one or more paths that simulate movement of one or more hypersonic vehicles (e.g., airplanes, missiles, spacecraft, etc.) when launched and/or otherwise in motion. As still another example, one or more combustible tracks 110 may be formed with dimensions and track shapes that, when burned and viewed from the point of view of the sensor location (e.g., sensor 302 on sensor mount 306) form one or more paths that simulate at least a portion of a pattern of a fireworks display. As one example, a simulated firework pattern may be printed on a tube, shot up into the air, and then allowed to float downward (e.g., from a balloon or parachute) while the simulation is activated to allow a test of the pattern.

CONCLUSION

For the avoidance of doubt, the present application includes, but is not limited to, the subject-matter described in the following numbered clauses:

Clause 1. A thermal and/or optical signature simulating structure, comprising: (a) a base including a first surface; and (b) a first combustible track fixed to the first surface, wherein the first combustible track includes a first combustible material, wherein the first combustible material may include (e.g., may be dispersed in) a first binder.

Clause 2. The thermal and/or optical signature simulating structure of Clause 1, wherein the first combustible material comprises a thermite material.

Clause 3. The thermal and/or optical signature simulating structure of Clause 1 or 2, wherein the first surface of the base includes a member formed from a non-flammable material, and/or a material with an ignition temperature higher than a temperature at which the first combustible material combusts, and/or a material selected from the group consisting of: wood, glass, wire mesh, and mica.

Clause 4. The thermal and/or optical signature simulating structure of any one of Clauses 1 to 3, further comprising: a second combustible track fixed to the first surface of the base and separated from the first combustible track.

Clause 5. The thermal and/or optical signature simulating structure of Clause 4, wherein the second combustible track includes a second combustible material, wherein the second combustible material may include (e.g., may be dispersed in) a second binder.

Clause 6. The thermal and/or optical signature simulating structure of Clause 5, wherein the second combustible material differs from the first combustible material, and/or wherein the second binder differs from the first binder.

Clause 7. The thermal and/or optical signature simulating structure of Clause 5, wherein the second combustible material is the same as the first combustible material, and/or wherein the second binder is the same as the first binder.

Clause 8. The thermal and/or optical signature simulating structure of any one of Clauses 1 to 7, further comprising: a first ignition source engaged with the base, the first ignition source being structured and arranged to initiate combustion of the first combustible track.

Clause 9. The thermal and/or optical signature simulating structure of any one of Clauses 1 to 8, further comprising: a first combustible region fixed to the first surface of the base, wherein the first combustible region combusts to produce a thermal and/or optical signature that differs from a thermal and/or optical signature produced by combustion of the first combustible track.

Clause 10. The thermal and/or optical signature simulating structure of any one of Clauses 1 to 9, wherein a first portion of the first combustible track includes the first combustible material wherein the first combustible track further includes a second portion continuous with the first portion, and wherein the second portion burns at a different rate and/or produces a different thermal and/or optical signature during combustion as compared to the first portion.

Clause 11. The thermal and/or optical signature simulating structure of any one of Clauses 1 to 9, wherein a first portion of the first combustible track includes the first combustible material dispersed in a first binder, wherein the first combustible track further includes a second portion continuous with the first portion, and wherein the second portion includes at least one of: a second combustible material different from the first combustible material, a second binder different from the first binder, or a different concentration of the first combustible material as compared to a concentration of the first combustible material in the first portion.

Clause 12. The thermal and/or optical signature simulating structure of any one of Clauses 1 to 11, wherein the first combustible track forms a path that, when combusted, simulates movement of a countermeasure deployed from a vehicle.

Clause 13. The thermal and/or optical signature simulating structure of any one of Clauses 1 to 11, wherein the first combustible track forms a path that, when combusted, simulates movement of a nuclear missile when launched and/or while in motion; or wherein the first combustible track forms a path that, when combusted, simulates movement of a hypersonic vehicle (e.g., airplanes, missiles, spacecraft, etc.) when launched and/or otherwise in motion.

Clause 14. The thermal and/or optical signature simulating structure of any one of Clauses 1 to 11, wherein the first combustible track forms a path that, when combusted, simulates at least a portion of a pattern of a fireworks display.

Clause 15. The thermal and/or optical signature simulating structure of any one of Clauses 1 to 14, wherein the first combustible track is applied to the first surface of the base as an extruded paste, an aerosol, or an ink.

Clause 16. An infrared and/or optical sensor test system, comprising: (a) an infrared and/or optical sensing system; (b) a simulator mount; and (c) a thermal and/or optical signature simulating structure according to any one of Clauses 1 to 15 engaged with the simulator mount.

Clause 17. The infrared and/or optical sensor test system of Clause 16, wherein the simulator mount is movable with respect to the infrared and/or optical sensing system.

Clause 18. The infrared and/or optical sensor test system of Clause 16 or 17, wherein the thermal and/or optical signature simulating structure is suspended from the simulator mount.

Clause 19. The infrared and/or optical sensor test system of any one of Clauses 16 to 18, wherein the infrared and/or optical sensing system includes at least one of infrared source tracking components or missile guidance system components.

Clause 20. A method of testing an infrared and/or optical sensor system, comprising:
  engaging a thermal and/or optical signature simulating structure with a simulator mount, wherein the thermal and/or optical signature simulating structure includes: (a) a base having a first surface, and (b) a first combustible track fixed to the first surface, wherein the first combustible track includes a first combustible material;
  arranging an infrared and/or optical sensing system in a position to receive infrared energy and/or visible light emitted by the thermal and/or optical signature simulating structure;
  igniting the first combustible material of the first combustible track such that combustion of the first combustible material moves along a first trail defined by the first combustible track; and
  determining whether the infrared and/or optical sensing system tracks infrared energy and/or visible light emitted by the first combustible track.

Clause 21. The method of Clause 20, wherein the thermal and/or optical signature simulating structure further includes a second combustible track fixed to the first surface and separated from the first combustible track, wherein the second combustible track includes a second combustible material, and wherein the method further includes:
  igniting the second combustible material such that combustion of the second combustible material moves along a second trail defined by the second combustible track; and
  determining whether the infrared and/or optical sensing system tracks infrared energy and/or visible light emitted by the second combustible track.

Clause 22. The method of Clause 21, wherein the second combustible material differs from the first combustible material in at least one of: a combustible material composition, a binder composition, or a concentration of combustible material in the respective track.

Clause 23. The method of Clause 21, wherein the second combustible material and the first combustible material are formed from at least one of: a common combustible material composition, a common binder composition, or equivalent concentrations of combustible material in the respective track.

Clause 24. The method of any one of Clauses 21 to 23, wherein igniting the first combustible material takes place before igniting the second combustible material.

Clause 25. The method of any one of Clauses 21 or 23, wherein igniting the first combustible material and igniting the second combustible material take place simultaneously.

Clause 26. The method of any one of Clauses 21 to 25, further comprising: printing the second combustible track on the first surface of the base.

Clause 27. The method of Clause 20, wherein the thermal and/or optical signature simulating structure further includes a first combustible region fixed to the first surface of the base, wherein the first combustible region combusts to produce a thermal and/or optical signature that differs from a thermal and/or optical signature produced by combustion of the first combustible track, and wherein the determining step includes determining whether the infrared and/or optical sensing system tracks the first combustible track or the first combustible region.

Clause 28. The method of any one of Clauses 20 to 27, wherein the simulator mount and the infrared and/or optical sensing system are separated from one another in a horizontal direction, and wherein the method further includes moving the simulator mount with respect to the infrared and/or optical sensing system in the horizontal direction while the first combustible material is combusting.

Clause 29. The method of any one of Clauses 20 to 28, wherein the thermal and/or optical signature simulating structure is suspended from the simulator mount.

Clause 30. The method of any one of Clauses 20 to 29, wherein the infrared and/or optical sensing system includes at least one of infrared source tracking components or missile guidance system components.

Clause 31. The method of any one of Clauses 20 to 30, further comprising: printing the first combustible track on the first surface of the base.

Clause 32. The method of any one of Clauses 20 to 31, further comprising: engaging an ignition source with the base at a location to ignite the first combustible track.

Clause 33. A countermeasure simulating structure, comprising: (a) a base including a first surface; and (b) a plurality of separated combustible tracks fixed to the first surface of the base, wherein each combustible track of the plurality of separated combustible tracks includes a combustible material, wherein the combustible material may include (e.g., may be dispersed in) a binder.

Clause 34. The countermeasure simulating structure of Clause 33, wherein the combustible material comprises a thermite material.

Clause 35. The countermeasure simulating structure of Clause 33 or 34, wherein the first surface of the base includes a member formed from a non-flammable material, and/or a material with an ignition temperature higher than a temperature at which the first combustible material combusts, and/or a material selected from the group consisting of: wood, glass, wire mesh, and mica.

Clause 36. The countermeasure simulating structure of any one of Clauses 33 to 35, wherein at least one combustible track of the plurality of separated combustible tracks differs from at least one other combustible track of the plurality of separated combustible tracks in at least one of: a combustible material composition, a binder composition, a concentration of combustible material, a width, a length, or a thickness in the respective track.

Clause 37. The countermeasure simulating structure of any one of Clauses 33 to 36, further comprising: one or more ignition sources engaged with the base, the one or more ignition sources being structured and arranged to initiate combustion of the plurality of separated combustible tracks simultaneously or at different times.

Clause 38. The countermeasure simulating structure of any one of Clauses 33 to 36, further comprising: a plurality of ignition sources engaged with the base, the plurality of ignition sources being structured and arranged to initiate combustion of the plurality of separated combustible tracks simultaneously or at different times.

Clause 39. The countermeasure simulating structure of any one of Clauses 33 to 38, further comprising: a first combustible region fixed to the first surface of the base, wherein the first combustible region combusts to produce a thermal and/or optical signature that differs from thermal and/or optical signatures produced by combustion of the plurality of separated combustible tracks.

Clause 40. The countermeasure simulating structure of Clause 39, wherein the plurality of separated combustible tracks are structured and arranged such that combustion of the plurality of separated combustible tracks simulate thermal and/or optical signatures of a plurality of deployed countermeasures, and wherein the first combustible region is structured and arranged such that combustion of the first combustible region simulates a thermal and/or optical signature of a first jet engine.

Clause 41. The countermeasure simulating structure of Clause 39, further comprising: a second combustible region fixed to the first surface of the base and separated from the first combustible region, wherein the second combustible region combusts to produce a thermal and/or optical signature that differs from thermal and/or optical signatures produced by combustion of the plurality of separated combustible tracks.

Clause 42. The countermeasure simulating structure of Clause 41, wherein: (a) the plurality of separated combustible tracks are structured and arranged such that combustion of the plurality of separated combustible tracks simulate thermal and/or optical signatures of deployed countermeasures, (b) the first combustible region is structured and arranged such that combustion of the first combustible region simulates a thermal and/or optical signature of a first jet engine, and (c) the second combustible region is structured and arranged such that combustion of the second combustible region simulates a thermal and/or optical signature of a second jet engine.

Clause 43. The countermeasure simulating structure of any one of Clauses 33 to 42, wherein at least one individual combustible track of the plurality of separated combustible tracks includes: (a) a first portion comprising a first combustible material (which may include (e.g., may be dispersed in) a first binder), and (b) a second portion continuous with the first portion, wherein the second portion burns at a different rate and/or produces a different thermal and/or optical signature during combustion as compared to the first portion.

Clause 44. The countermeasure simulating structure of any one of Clauses 33 to 42, wherein at least one individual combustible track of the plurality of separated combustible tracks includes: (a) a first portion comprising a first combustible material dispersed in a first binder, and (b) a second portion continuous with the first portion, wherein the second portion includes at least one of: a second combustible material different from the first combustible material, a second binder different from the first binder, or a different concentration of the first combustible material as compared to a concentration of the first combustible material in the first portion.

Clause 45. The countermeasure simulating structure of any one of Clauses 33 to 44, wherein the plurality of separated combustible tracks are applied to the first surface of the base as an extruded paste, an aerosol, and/or an ink.

Clause 46. A countermeasure simulating system, comprising: (a) an infrared and/or optical sensing system; (b) a simulator mount; and (c) a countermeasure simulating structure according to any one of Clauses 33 to 45 engaged with the simulator mount.

Clause 47. The countermeasure simulating system of Clause 46, wherein the simulator mount is movable with respect to the infrared and/or optical sensing system.

Clause 48. The countermeasure simulating system of Clause 46 or 47, wherein the countermeasure simulating structure is suspended from the simulator mount.

Clause 49. The countermeasure simulating system of any one of Clauses 46 to 48, wherein the infrared and/or optical sensing system includes at least one of infrared source tracking components or missile guidance system components.

Clause 50. A method of testing a countermeasure system, comprising:
  engaging a countermeasure simulating structure with a simulator mount, wherein the countermeasure simulating structure includes: (a) a base having a first surface, and (b) a first combustible track fixed to the first surface, wherein the first combustible track includes a first combustible material (which may include (e.g., may be dispersed in) a first binder);
  arranging an infrared and/or optical sensing system in a position to receive infrared energy and/or visible light emitted by the countermeasure simulating structure;
  igniting the first combustible material of the first combustible track such that combustion of the first combustible material moves along a first trail defined by the first combustible track; and
  determining whether the infrared and/or optical sensing system tracks infrared energy and/or visible emitted by the first combustible track.

Clause 51. The method of Clause 50, wherein the countermeasure simulating structure further includes a second combustible track fixed to the first surface and separated from the first combustible track, wherein the second combustible track includes a second combustible material (which may include (e.g., may be dispersed in) a second binder), and wherein the method further includes:
  igniting the second combustible material such that combustion of the second combustible material moves along a second trail defined by the second combustible track; and
  determining whether the infrared and/or optical sensing system tracks infrared energy and/or visible light emitted by the second combustible track.

Clause 52. The method of Clause 51, wherein the second combustible material differs from the first combustible material in at least one of: a combustible material composition, a binder composition, or a concentration of combustible material in the respective track.

Clause 53. The method of Clause 51, wherein the second combustible material and the first combustible material are formed from at least one of: a common combustible material composition, a common binder composition, or equivalent concentrations of combustible material in the respective track.

Clause 54. The method of any one of Clauses 51 or 53, wherein igniting the first combustible material takes place before igniting the second combustible material.

Clause 55. The method of any one of Clauses 51 or 53, wherein igniting the first combustible material takes place simultaneous with igniting the second combustible material.

Clause 56. The method of any one of Clauses 51 to 55, wherein the countermeasure simulating structure further includes a first combustible region fixed to the first surface of the base, wherein the first combustible region produces a thermal and/or optical signature during combustion that differs from a first thermal and/or optical signature produced by combustion of the first combustible track and a second thermal and/or optical signature produced by combustion of the second combustible track, and wherein the determining step includes determining whether the infrared and/or optical sensing system tracks the first combustible track, the second combustible track, or the first combustible region.

Clause 57. The method of Clause 56, wherein: (a) the thermal and/or optical signature produced by combustion of the first combustible region simulates a thermal and/or optical signature of a first jet engine, (b) the first thermal and/or optical signature produced by combustion of the first combustible track simulates motion of a first deployed countermeasure, and (c) the second thermal and/or optical signature produced by combustion of the second combustible track simulates motion of a second deployed countermeasure.

Clause 58. The method of any one of Clauses 51 to 55, wherein the countermeasure simulating structure further includes: (a) a first combustible region fixed to the first surface of the base, wherein the first combustible region produces a thermal and/or optical signature during combustion that differs from a first thermal and/or optical signature produced by combustion of the first combustible track and a second thermal and/or optical signature produced by combustion of the second combustible track and (b) a second combustible region fixed to the first surface of the base, wherein the second combustible region produces a thermal and/or optical signature during combustion that differs from the first thermal and/or optical signature produced by combustion of the first combustible track and the second thermal and/or optical signature produced by combustion of the second combustible track, and wherein the determining step includes determining whether the infrared and/or optical sensing system tracks the first combustible track, the second combustible track, the first combustible region, or the second combustible region.

Clause 59. The method of Clause 58, wherein: (a) the thermal and/or optical signature produced by combustion of the first combustible region simulates a thermal and/or optical signature of a first jet engine, (b) the thermal and/or optical signature produced by combustion of the second combustible region simulates a thermal and/or optical signature of a second jet engine, (c) the first thermal and/or optical signature produced by combustion the first combustible track simulates motion of a first deployed countermeasure, and (d) the second thermal and/or optical signature produced by combustion of the second combustible track simulates motion of a second deployed countermeasure.

Clause 60. The method of any one of Clauses 51 to 59, further comprising: printing the second combustible track on the first surface of the base.

Clause 61. The method of Clause 50, wherein the countermeasure simulating structure further includes a first combustible region fixed to the first surface of the base, wherein the first combustible region produces a thermal and/or optical signature during combustion that differs from a thermal and/or optical signature produced by combustion of the first combustible track, and wherein the determining step includes determining whether the infrared and/or optical sensing system tracks the first combustible track or the first combustible region.

Clause 62. The method of any one of Clauses 50 to 61, wherein the simulator mount and the infrared and/or optical sensing system are separated from one another in a horizontal direction, and wherein the method further includes moving the simulator mount with respect to the infrared and/or optical sensing system in the horizontal direction while the first combustible material is combusting.

Clause 63. The method of any one of Clauses 50 to 62, wherein the countermeasure simulating structure is suspended from the simulator mount.

Clause 64. The method of any one of Clauses 50 to 63, wherein the infrared and/or optical sensing system includes at least one of infrared source tracking components or missile guidance system components.

Clause 65. The method of any one of Clauses 50 to 64, further comprising: printing the first combustible track on the first surface of the base.

Clause 66. The method of any one of Clauses 50 to 65, further comprising: engaging an ignition source with the base at a location to ignite the first combustible track.

Clause 67. A method of producing a thermal and/or optical signature simulating structure, comprising: (a) printing a first combustible track onto a first surface of a base, wherein the first combustible track includes a first combustible material (which may include (e.g., may be dispersed in) a first binder) and a solvent; and (b) removing at least a portion of the solvent.

Clause 68. The method of Clause 67, wherein the first combustible material comprises a thermite material.

Clause 69. The method of Clause 67 or 68, wherein the first surface of the base includes a member selected from the group consisting of: wood, glass, wire mesh, and mica.

Clause 70. The method of any one of Clauses 67 to 69, further comprising: printing a second combustible track onto the first surface of the base at a location separated from the first combustible track.

Clause 71. The method of Clause 70, wherein the second combustible track includes a second combustible material (which may include (e.g., may be dispersed in) a second binder).

Clause 72. The method of Clause 71, wherein the second combustible material differs from the first combustible material, and/or wherein the second binder differs from the first binder.

Clause 73. The method of Clause 71, wherein the second combustible material is the same as the first combustible material, and/or wherein the second binder is the same as the first binder.

Clause 74. The method of any one of Clauses 67 to 73, further comprising: engaging a first ignition source with the base, the first ignition source being structured and arranged to initiate combustion of the first combustible track.

Clause 75. The method of any one of Clauses 67 to 74, further comprising: printing a first combustible region onto the first surface of the base and separate from the first combustible track, wherein the first combustible region produces a thermal and/or optical signature during combustion that differs from a thermal and/or optical signature produced by combustion of the first combustible track.

Clause 76. The method of any one of Clauses 67 to 75, wherein a first portion of the first combustible track includes the first combustible material dispersed in the first binder, wherein the first combustible track further includes a second portion continuous with the first portion, wherein the second portion is formed from a material that burns at a different rate and/or produces a different thermal and/or optical signature as compared to the first portion.

Clause 77. The method of any one of Clauses 67 to 75, wherein a first portion of the first combustible track includes the first combustible material dispersed in the first binder, wherein the first combustible track further includes a second portion continuous with the first portion, wherein the second portion includes at least one of: a second combustible material different from the first combustible material, a second binder different from the first binder, or a different concentration of the first combustible material as compared to a concentration of the first combustible material in the first portion.

Clause 78. The method of any one of Clauses 67 to 77, wherein the first combustible track is printed in a path that simulates movement of a countermeasure deployed from a vehicle when the first combustible track is combusted.

Clause 79. The method of any one of Clauses 67 to 77, wherein the first combustible track is printed in a path that simulates at least some portion of movement of a nuclear missile when the first combustible track is combusted (e.g., the missile's launch); or wherein the first combustible track is printed in a path that simulates at least some portion of movement of a hypersonic vehicle (e.g., airplanes, missiles, spacecraft, etc.) when the first combustible track is combusted (e.g., the vehicle's launch).

Clause 80. The method of any one of Clauses 67 to 77, wherein the first combustible track is printed in a path that simulates at least a portion of a pattern of a fireworks display when the first combustible track is combusted.

Clause 81. The method of any one of Clauses 67 to 80, wherein the first combustible track is printed onto the first surface of the base as an extruded paste, an aerosol, or an ink.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

We claim:

1. A countermeasure simulating structure, comprising: (a) a base including a first surface; and (b) a plurality of separated combustible tracks fixed to the first surface of the base, wherein each combustible track of the plurality of separated combustible tracks includes a combustible material.

2. The countermeasure simulating structure of claim 1, wherein the combustible material comprises a thermite material.

3. The countermeasure simulating structure of claim 1, wherein at least one combustible track of the plurality of separated combustible tracks differs from at least one other combustible track of the plurality of separated combustible tracks in at least one of: a combustible material composition, a binder composition, or a concentration of combustible material in the respective track.

4. The countermeasure simulating structure of claim 1, further comprising one or more ignition sources being structured and arranged to initiate combustion of the plurality of separated combustible tracks simultaneously or at different times.

5. The countermeasure simulating structure of claim 1, further comprising: a first combustible region fixed to the first surface of the base, wherein the first combustible region combusts to produce a thermal and/or optical signature that differs from thermal and/or optical signatures produced by combustion of the plurality of separated combustible tracks.

6. The countermeasure simulating structure of claim 5, wherein the plurality of separated combustible tracks are structured and arranged such that combustion of the plurality of separated combustible tracks simulate thermal and/or optical signatures of a plurality of deployed countermeasures, and wherein the first combustible region is structured and arranged such that combustion of the first combustible region simulates a thermal and/or optical signature of a first jet engine.

7. The countermeasure simulating structure of claim 5, further comprising: a second combustible region fixed to the first surface of the base and separated from the first combustible region, wherein the second combustible region combusts to produce a thermal and/or optical signature that differs from thermal and/or optical signatures produced by combustion of the plurality of separated combustible tracks, wherein: (a) the plurality of separated combustible tracks are structured and arranged such that combustion of the plurality of separated combustible tracks simulate thermal and/or optical signatures of deployed countermeasures, (b) the first combustible region is structured and arranged such that combustion of the first combustible region simulates a thermal and/or optical signature of a first jet engine, and (c) the second combustible region is structured and arranged such that combustion of the second combustible region simulates a thermal and/or optical signature of a second jet engine.

8. The countermeasure simulating structure of claim 1, wherein the plurality of separated combustible tracks are applied to the first surface of the base as an extruded paste, an aerosol, and/or an ink.

9. A countermeasure simulating system, comprising: (a) an infrared and/or optical sensing system; (b) a simulator mount; and (c) a countermeasure simulating structure engaged with the simulator mount, wherein the countermeasure simulating structure includes: (a) a base including a first surface; and (b) a plurality of separated combustible tracks fixed to the first surface of the base, wherein each combustible track of the plurality of separated combustible tracks includes a combustible material.

10. The countermeasure simulating system of claim 9, wherein the simulator mount is movable with respect to the infrared and/or optical sensing system.

11. The countermeasure simulating system of claim 9, wherein the countermeasure simulating structure is suspended from the simulator mount.

12. The countermeasure simulating system of claim 9, wherein the infrared and/or optical sensing system includes at least one of infrared source tracking components or missile guidance system components.

13. A method of testing a countermeasure system, comprising:
engaging a countermeasure simulating structure with a simulator mount, wherein the countermeasure simulating structure includes: (a) a base having a first surface, and (b) a first combustible track fixed to the first surface, wherein the first combustible track includes a first combustible material;
arranging an infrared and/or optical sensing system in a position to receive infrared energy and/or visible light emitted by the countermeasure simulating structure;
igniting the first combustible material of the first combustible track such that combustion of the first combustible material moves along a first trail defined by the first combustible track; and
determining whether the infrared and/or optical sensing system tracks infrared energy and/or visible emitted by the first combustible track.

14. The method of claim 13, wherein the countermeasure simulating structure further includes a second combustible track fixed to the first surface and separated from the first combustible track, wherein the second combustible track includes a second combustible material, and wherein the method further includes:
igniting the second combustible material such that combustion of the second combustible material moves along a second trail defined by the second combustible track; and
determining whether the infrared and/or optical sensing system tracks infrared energy and/or visible light emitted by the second combustible track.

15. The method of claim 14, wherein igniting the first combustible material takes place simultaneous with igniting the second combustible material.

16. The method of claim 14, wherein the countermeasure simulating structure further includes: (a) a first combustible region fixed to the first surface of the base, wherein the first combustible region produces a thermal and/or optical signature during combustion that differs from a first thermal and/or optical signature produced by combustion of the first combustible track and a second thermal and/or optical signature produced by combustion of the second combustible track and (b) a second combustible region fixed to the first surface of the base, wherein the second combustible region produces a thermal and/or optical signature during combustion that differs from the first thermal and/or optical signature produced by combustion of the first combustible track and the second thermal and/or optical signature produced by combustion of the second combustible track, and wherein the determining steps include determining whether the infrared and/or optical sensing system tracks the first combustible track, the second combustible track, the first combustible region, or the second combustible region.

17. The method of claim 14, further comprising: printing the second combustible track on the first surface of the base.

18. The method of claim 13, wherein the countermeasure simulating structure further includes a first combustible region fixed to the first surface of the base, wherein the first combustible region produces a thermal and/or optical signature during combustion that differs from a thermal and/or optical signature produced by combustion of the first combustible track, and wherein the determining step includes determining whether the infrared and/or optical sensing system tracks the first combustible track or the first combustible region.

19. The method of claim 13, wherein the simulator mount and the infrared and/or optical sensing system are separated from one another in a horizontal direction, and wherein the method further includes moving the simulator mount with respect to the infrared and/or optical sensing system in the horizontal direction while the first combustible material is combusting.

20. The method of claim 13, further comprising: printing the first combustible track on the first surface of the base.

* * * * *